US011198068B2

(12) United States Patent
Colatruglio

(10) Patent No.: US 11,198,068 B2
(45) Date of Patent: Dec. 14, 2021

(54) METHOD OF CONDUCTING A FANTASY SPORTS GAME

(71) Applicant: eFantasy Sports LLC, Westerville, OH (US)

(72) Inventor: Jason Colatruglio, Westerville, OH (US)

(73) Assignee: EFANTASY SPORTS LLC, Westerville, OH (US)

( * ) Notice: Subject to any disclaimer, the term of this patent is extended or adjusted under 35 U.S.C. 154(b) by 0 days.

(21) Appl. No.: 16/792,675

(22) Filed: Feb. 17, 2020

(65) Prior Publication Data

US 2020/0261807 A1   Aug. 20, 2020

Related U.S. Application Data

(60) Provisional application No. 62/807,041, filed on Feb. 18, 2019.

(51) Int. Cl.
*A63F 13/828* (2014.01)
*A63F 13/537* (2014.01)

(52) U.S. Cl.
CPC .......... *A63F 13/828* (2014.09); *A63F 13/537* (2014.09); *A63F 2300/8052* (2013.01)

(58) Field of Classification Search
CPC .................................................. A63F 13/828
See application file for complete search history.

(56) References Cited

U.S. PATENT DOCUMENTS

| | | | |
|---|---|---|---|
| 9,399,170 B2 | 7/2016 | Cook et al. | |
| 9,610,491 B2 * | 4/2017 | Cronin | A63B 71/06 |
| 2002/0119823 A1 * | 8/2002 | Beuscher | A63F 13/335 463/42 |
| 2002/0147039 A1 * | 10/2002 | Mahar | A63F 1/00 463/11 |
| 2004/0266535 A1 * | 12/2004 | Reeves | A63F 13/69 463/42 |
| 2006/0052147 A1 * | 3/2006 | Matthews | A63F 13/12 463/4 |
| 2007/0202952 A1 * | 8/2007 | Francis | A63F 1/02 463/42 |
| 2008/0268929 A1 * | 10/2008 | Billmaier | G07F 17/3276 463/4 |

(Continued)

*Primary Examiner* — Steven J Hylinski
(74) *Attorney, Agent, or Firm* — Michael E. Dockins; Shumaker, Loop & Kendrick, LLP

(57) ABSTRACT

Systems, methods, and computer program products are provided for implementing a fantasy sports game that shares the same objective as an actual sporting contest and that is based on individual plays from actual games executed in the fantasy sports game according to selection criteria. Fantasy game play is based on the outcomes of individual plays, instead of aggregate stats and/or fantasy points, which allows for a fantasy game with realistic game flow. The method executes plays, without active participation from a fantasy player, based on selection criteria which compare the current fantasy contest situation to the situation of the actual sporting contest when the outcome was recorded and applies the outcome to the fantasy game from the actual play which is most similar in situation. The result is a fantasy game carried out through individual plays which can be viewed like an actual sporting event.

18 Claims, 13 Drawing Sheets

(56) References Cited

U.S. PATENT DOCUMENTS

| | | | |
|---|---|---|---|
| 2009/0061970 A1* | 3/2009 | Wylie | A63F 13/80 |
| | | | 463/1 |
| 2010/0099472 A1* | 4/2010 | Harris | A63F 13/46 |
| | | | 463/2 |
| 2010/0120489 A1* | 5/2010 | Meyer | G07F 17/32 |
| | | | 463/19 |
| 2012/0149473 A1* | 6/2012 | Moore | A63F 13/35 |
| | | | 463/42 |
| 2013/0316837 A1* | 11/2013 | Coiner, Jr. | G06F 16/73 |
| | | | 463/43 |
| 2015/0058730 A1* | 2/2015 | Dubin | A63F 13/327 |
| | | | 715/719 |
| 2015/0172246 A1* | 6/2015 | Velummylum | H04L 51/08 |
| | | | 709/206 |
| 2015/0298009 A1 | 10/2015 | Bertel | |
| 2015/0315643 A1 | 11/2015 | O'Garra et al. | |
| 2016/0041661 A1 | 2/2016 | Bertel | |
| 2017/0319970 A1 | 11/2017 | Thorman | |
| 2018/0280811 A1 | 10/2018 | Martin | |
| 2019/0065590 A1* | 2/2019 | Li | G06F 16/64 |

\* cited by examiner

FANTASY FOOTBALL METHOD FLOW CHART

FIG. 1B

I - Apply Play Outcome to current game situation, as necessary, including changing field position, changing down and distance, turning ball over, scoring or progressing the game clock J - If a player injury occurred during the play, remove player from Priority and elevate priority of lesser players going forward K - If Down after play is 1st, 2nd or 3rd down return to Step G L – If Down after play is 4th down then Consult 4th Down Recommendation and either Go for it, Punt or Kick a Field Goal. Go for it results in either a 1st down (return to Step G for same team) or Turnover on Downs (return to Step G for other team), Punt results in giving the ball to the other team (return to Step G for other team) and field goal results in 3 points for team M - Play continues on this loop until halftime. In the 2$^{nd}$ half possession goes to the team who did not start with the ball and play continues from Step G until time expires in the fourth quarter N - In the event of a tie, an overtime period is held to determine a winner O - The plays are organized into a game flow and the participants may watch or listen to the game play by play to learn the winner

Priority Set by User - Locked at Kick Off of Player Game

| Rude Men | | |
|---|---|---|
| Priority | Pos | Player |
| 1 | RB | Christian McCaffery |
| 2 | RB | Justin Jackson |
| 3 | WR | Corey Davis |
| 4 | WR | Courtland Sutton |
| 5 | TE | Ian Thomas |
| 6 | QB | Ben Rothlisberger |
| 7 | RB | Derrick Henry |
| 8 | WR | Kenny Golladay |
| 9 | WR | Doug Baldwin |
| 10 | TE | Chris Hernon |
| 11 | QB | Matthew Stafford |
| | | |
| DEF | | Baltimore |

| The Mutants | | |
|---|---|---|
| Priority | Pos | Player |
| 1 | WR | Keenan Allen |
| 2 | RB | Phillip Lindsey |
| 3 | WR | Julian Edelman |
| 4 | TE | Zach Ertz |
| 5 | RB | Aaron Jones |
| 6 | QB | Deshaun Watson |
| 7 | RB | Damian Williams |
| 8 | RB | Jeff Wilson |
| 9 | WR | Taylor Gabriel |
| 10 | RB | Dion Lewis |
| 11 | TE | Austin Hooper |
| 12 | QB | Baker Mayfield |
| DEF | | Minnesota |

2:08 remaining in the 1st Quarter Aaron Jones leaves with injury and does not return to action. He is removed from line up and game continues with The Mutants priority per below

| The Mutants | | |
|---|---|---|
| Priority | Pos | Player |
| 1 | WR | Keenan Allen |
| 2 | RB | Phillip Lindsey |
| 3 | WR | Julian Edelman |
| 4 | TE | Zach Ertz |
| 5 | RB | Damian Williams |
| 6 | QB | Deshaun Watson |
| 7 | RB | Jeff Wilson |
| 8 | WR | Taylor Gabriel |
| 9 | RB | Dion Lewis |
| 10 | TE | Austin Hooper |
| 11 | QB | Baker Mayfield |
| DEF | | Minnesota |

FIG. 2A

10:37 remaining in the 2nd Quarter Keenan Allen leaves with injury and does not return to action. He is removed from line up and game continues with The Mutants priority per below.

| The Mutants | | |
|---|---|---|
| Priority | Pos | Player |
| 1 | RB | Phillip Lindsey |
| 2 | WR | Julian Edelman |
| 3 | TE | Zach Ertz |
| 4 | RB | Damian Williams |
| 5 | WR | Taylor Gabriel |
| 6 | QB | Deshaun Watson |
| 7 | RB | Jeff Wilson |
| 8 | RB | Dion Lewis |
| 9 | TE | Austin Hooper |
| 10 | QB | Baker Mayfield |
| DEF | | Minnesota |

FIG. 2B

All Plays from Start of game through 2:08 left in Q1 are logged with Player Priority per this table. At this point of game Aaron Jones leaves the game with injury and doesn't return

| Priority | Pos | Player |
|---|---|---|
| 1 | WR | Keenan Allen |
| 2 | RB | Phillip Lindsey |
| 3 | WR | Julian Edelman |
| 4 | TE | Zach Ertz |
| 5 | RB | Aaron Jones |
| 6 | QB | Deshaun Watson |
| 7 | RB | Damian Williams |
| 8 | RB | Jeff Wilson |
| 9 | WR | Taylor Gabriel |
| 10 | TE | Austin Hooper |
| 11 | QB | Baker Mayfield |
| DEF | | Minnesota |

All Plays from 2:08 left in Q1 through 10:37 left in Q2 are logged with Player Priority per this table. At this point of game Keenan Allen leaves the game with injury and doesn't return

| Priority | Pos | Player |
|---|---|---|
| 1 | WR | Keenan Allen |
| 2 | RB | Phillip Lindsey |
| 3 | WR | Julian Edelman |
| 4 | TE | Zach Ertz |
| 5 | RB | Damian Williams |
| 6 | QB | Deshaun Watson |
| 7 | RB | Jeff Wilson |
| 8 | WR | Taylor Gabriel |
| 9 | TE | Austin Hooper |
| 10 | QB | Baker Mayfield |
| DEF | | Minnesota |

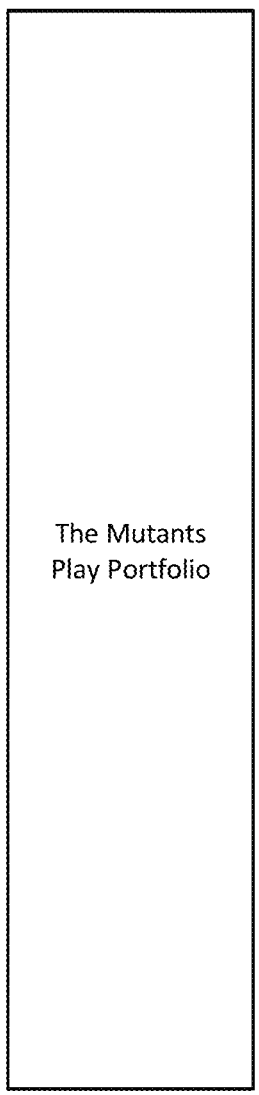

The Mutants Play Portfolio

All Plays from 10:37 left in Q2 through the end of game are logged with Player Priority per this table

| Priority | Pos | Player |
|---|---|---|
| 1 | RB | Phillip Lindsey |
| 2 | WR | Julian Edelman |
| 3 | TE | Zach Ertz |
| 4 | RB | Damian Williams |
| 5 | WR | Taylor Gabriel |
| 6 | QB | Deshaun Watson |
| 7 | RB | Jeff Wilson |
| 8 | TE | Austin Hooper |
| 9 | QB | Baker Mayfield |
| DEF | | Minnesota |

The table below in grey represent actual plays. The result of each play is applied to the game situation and results in the game situation after the play. The after play game situation for play 17 becomes the before play game situation for play 18 and so on

| | Actual Play | | | | | | Before Play Game Situation | | | | Result of Play | | | After Play Game Situation | | |
|---|---|---|---|---|---|---|---|---|---|---|---|---|---|---|---|---|
| Play | Quarter | Down | To Go | Yard Line | Description | | Yards Gained | Player | Priority | Game Clock | Yard Line | Down | To Go | Yards Gained | Comment | Game Clock | Yard Line | Down | To Go |
| 17 | 1 | 1 | 10 | 30 | (9:02) (SHOTGUN) 32-J.JACKSON LEFT TACKLE TO LAC 33 FOR 3 YARDS | 3 | J.JACKSON | 2 | 319 | 32 | 1 | 10 | 3 | | 359 | 35 | 2 | 7 |

| Actual Play | | | | | | | | | Result of Play | | After Play Game Situation | | | |
|---|---|---|---|---|---|---|---|---|---|---|---|---|---|---|
| Play | Quarter | Down | To Go | Yard Line | Description | Yards Gained | Player | Priority | Game Clock | Yard Line | Down | To Go | Yards Gained | Comment | Game Clock | Yard Line | Down | To Go |
| 18 | 1 | 2 | 6 | 29 | (1:41) 22-C.MCCAFFREY LEFT GUARD TO CAR 34 FOR 5 YARDS | 5 | C.MCCAFFREY | 1 | 359 | 35 | 2 | 7 | 5 | | 403 | 40 | 3 | 2 |

| | | | |
|---|---|---|---|
| Actual Play | Play | | 19 |
| | Quarter | | 2 |
| | Down | | 3 |
| | To Go | | 3 |
| | Yard Line | | 32 |
| | Description | (13:04) (SHOTGUN) 4-C.KEENUM PASS SHORT RIGHT TO 14-C.SUTTON TO DEN 38 FOR 6 YARDS | |
| | Yards Gained | | 6 |
| | Player | C.SUTTON | |
| | Priority | | 4 |
| Before Play Game Situation | Game Clock | | 403 |
| | Yard Line | | 40 |
| | Down | | 3 |
| | To Go | | 2 |
| Result of Play | Yards Gained | | 6 |
| | Comment | | |
| After Play Game Situation | Game Clock | | 446 |
| | Yard Line | | 46 |
| | Down | | 1 |
| | To Go | | 10 |

Real Game Scenario is used to identify similarly with Fantasy Game Scenario to determine which play is selected and executed in the fantasy game with outcome applied to create a new fantasy game scenario

| | | | Scenario when play was executed in Real Game | | | | Outcomes of Play | | | |
|---|---|---|---|---|---|---|---|---|---|---|
| Down | Distance | Yardline | Quarter | Time in Game (sec) | Player Priority | Score Differential | yards | TD | TO | Time elapsed |
| 1 | 10 | 1 | 1 | 0 | Position-1 | | | | | |
| 2 | 9 | 2 | 2 | 900 | Position-2 | | | | | |
| 3 | 8 | 3 | 3 | 1800 | Position-3 | | | | | |
| 4 | 7 | 4 | 4 | 2700 | Position-4 | | | | | |
| | 6 | 5 | OT | 3600 | Position-5 | | | | | |
| | 5 | 6 | | | QB-1 | | | | | |
| | 4 | 7 | | | Position-6 | | | | | |
| | 3 | 8 | | | Position-7 | | | | | |
| | 2 | 9 | | | Position-8 | | | | | |
| | 1 | 10 | | | Position-9 | | | | | |
| | 0 | to 100 | | | Position-10 | | | | | |
| | 11 | | | | Position-11 | | | | | |
| | 12 | | | | | | | | | |
| | 13 | | | | | | | | | |
| | 14 | | | | | | | | | |
| | 15 | | | | | | | | | |
| | 16 | | | | | | | | | |
| | 17 | | | | | | | | | |
| | 18 | | | | | | | | | |
| | 19 | | | | | | | | | |
| | 20 | | | | | | | | | |

FIG. 5

| | GUARDS | | | | | FORWARDS | | | | | CENTERS | | |
|---|---|---|---|---|---|---|---|---|---|---|---|---|---|
| | 2 | 4 | 8 | 9 | | 1 | 5 | 6 | 10 | | 3 | 7 | 11 |
| | J.Harden | D.Lilliard | R.Westbrook | L.Doncic | | L.James | P.George | K.Leonard | J.Tatum | | A.Davis | N.Jokic | J.Embiid |
| 1 | | | | | 1 | | | | | 1 | | | |
| 2 | | | | | 2 | | | | | 2 | | | |
| 3 | | | | | 3 | | | | | 3 | | | |
| 4 | | | | | 4 | | | | | 4 | | | |
| 5 | | | | | 5 | | | | | 5 | | | |
| 6 | | | | | 6 | | | | | 6 | | | |
| 7 | | | | | 7 | | | | | 7 | | | |
| 8 | | | | | 8 | | | | | 8 | | | |
| 9 | | | | | 9 | | | | | 9 | | | |
| 10 | | | | | 10 | | | | | 10 | | | |
| 11 | | | | | 11 | | | | | 11 | | | |
| 12 | | | | | 12 | | | | | 12 | | | |
| 13 | | | | | 13 | | | | | 13 | | | |
| 14 | | | | | 14 | | | | | 14 | | | |
| 15 | | | | | 15 | | | | | 15 | | | |
| 16 | | | | | 16 | | | | | 16 | | | |
| 17 | | | | | 17 | | | | | 17 | | | |
| 18 | | | | | 18 | | | | | 18 | | | |
| 19 | | | | | 19 | | | | | 19 | | | |
| 20 | | | | | 20 | | | | | 20 | | | |
| 21 | | | | | 21 | | | | | 21 | | | |
| 22 | | | | | 22 | | | | | 22 | | | |
| 23 | | | | | 23 | | | | | 23 | | | |
| 24 | | | | | 24 | | | | | 24 | | | |

FANTASY BASKETBALL METHOD FLOW CHART

A - Create team with sufficient number of players at each position

B - Assign a priority to each player on the team. Players with higher priority are more likely to have their plays executed Player Priority Locks when Player's Game begins and there is no more user input C - Actual Games are played D - Game Play occurs virtually after all the inputs of the game are known and before any game play is shared with the participants F – Execute Substitutions for the entire game. Ensure that the highest priority players are "In" the game at each position at all times E - Collect all plays executed by players during times they are "In" the Game to create the "Play Portfolio"

G1 – If Foul exists in "Play Portfolio" between game start and current game time + 24 seconds. Select Foul G - Compare current game time against plays in "Play Portfolio" and select play based on similarity according to selection criteria G2 – If Turnover exists in "Play Portfolio" between game start and current game time + 24 seconds. Select Turnover H - Execute selected play or defensive play, advance game clock and remove play from "Play Portfolio"

G3 – Select made shot, missed shot or assist which is close to current game time with tiebreaker being highest player priority Method continued on next page ->

I – If Selected Play is an offensive foul or turnover, the defense obtains possession and return to Step G J – If Selected Play is a non-shooting defensive foul, offensive team retains game and return to Step G K – If Selected Play is a shooting foul, select foul shots from "Play Portfolio" to apply. Increase Score for made foul shots. If last foul shot is made, possession goes to defensive team and return to Step G. If last foul shot is missed, go to Step M.

L – If Selected Play is a made basket, increase score total. Possession goes to defensive team and return to step G M – If selected play is missed shot or missed foul shot, closest offensive or defensive rebound to game time determines possession and then return to Step G N – If selected play is an assist, the assist must be matched with the nearest assisted made basket from the "Play Portfolio", score increased and both plays are removed from the "Play Portfolio"

O – Play continues until the fantasy game clock reaches full time

P - In the event of a tie, an overtime period is held to determine a winner

Q - The plays are organized into a game flow and the participants may watch or listen to the game play by play to learn the winner

FIG. 7B

METHOD OF CONDUCTING A FANTASY SPORTS GAME

CROSS-REFERENCE TO RELATED APPLICATIONS

This application claims the benefit of U.S. Provisional Application No. 62/807,041, filed on Feb. 18, 2019. The entire disclosure of the above application is incorporated herein by reference.

FIELD

The present technology relates to ways of conducting a fantasy sports game.

INTRODUCTION

This section provides background information related to the present disclosure which is not necessarily prior art.

In traditional fantasy sports scoring, each fantasy player contributes to the fantasy team score through a sum total of the player's specific stats (e.g., yards, assists, rebounds, home runs, etc.) times a multiplier factor (e.g., 1.2 times assists, 4 times home runs, etc.) to calculate points. In this scoring, only totals matter. While this method of fantasy sports has gained widespread popularity, it does not accurately reflect the game play nature of sports. A sporting match is carried out through a series of offensive and defensive plays. The context and result of these plays contribute to the team's success or failure in scoring and ultimately determine the winner, not the sum total of each individual's statistics.

Experienced fantasy players have found that the way to excel in this numbers driven game is through spreadsheet crunching and data mining analysis. Fantasy players look for an edge by projecting volume in an attempt to increase the likelihood of a player accumulating raw stats. It is no wonder that fantasy sports demographics skew towards males, aged 30+ with college degrees. Fantasy sports games are not reaching a younger and broader demographic because they find the hobby boring and the scoring which rewards the "man behind the computer" is a leading factor.

The fantasy sports industry is growing and expanding at a rapid rate. Daily Fantasy Sports has made strides to remove season long commitments as a hurdle to fantasy sports participation, however, all fantasy sports formats still rely on traditional fantasy scoring principals. Most innovations in fantasy sports are simply tweaks to scoring multipliers, starting rosters, or by adding roster management systems (e.g., salary caps, general manager experience, etc). While these changes feed the demand for new game types, they also increase complexity, time spent by the user and the required level of skill. Furthermore, complex game formats only act to entrench fantasy sports within the majority demographic of the hobby. The market is ready to support a complimentary product which embraces complex, experiential game play while remaining accessible to an entry level fantasy player.

SUMMARY

The present technology includes articles of manufacture, systems, and processes that relate to ways of conducting an entertainment game for one or more players, such as a fantasy sports game.

Ways are provided for implementing a fantasy sports game that share the same objectives as an actual sporting contest and that are based on individual plays from actual games that are then executed in the fantasy sports game according to selection criteria. Fantasy game play is based on the outcomes of individual plays, instead of aggregate statistics and/or fantasy points, which allows for a fantasy game with realistic game flow. The present technology can execute plays, without active participation from a fantasy player, based on selection criteria which compare the current fantasy contest situation to the situation of the actual sporting contest when the outcome was recorded, and applies the outcome to the fantasy game from the actual play that is most similar in situation. The result is a fantasy game carried out through individual plays that can be viewed like an actual sporting event.

In conducting a fantasy sports game, a first user or fantasy player of the fantasy game can assign a first set of priorities to a first plurality of players on a first fantasy team, where the first plurality of players correspond to a first plurality of players of one or more real sporting events. The first fantasy team can be created by having the first user select the first plurality of players on the first fantasy team. Data corresponding to a first plurality of plays performed by the first plurality of players of the one or more real sporting events can be received to create a first play portfolio. A fantasy sporting event is performed by comparing a game situation with the first play portfolio and selecting a play from the first play portfolio based upon first selection criteria, the first selection criteria including a first set of priorities assigned to the first plurality of players and a statistic of the play, the selected play from the first play portfolio is executed to advance the game situation based upon the selected play and update the game situation, the selected play is redacted from the first play portfolio, whereupon this series of steps is repeated to continue to advance the game situation based upon another selected play from the first play portfolio, to update the game situation, and to redact the another selected play from the first play portfolio until a predetermined event occurs.

Fantasy sports games can therefore have plays executed based on selection criteria including priority assigned by a user in conjunction with situational or statistic similarity to a play from the play portfolio, where the play portfolio can be created and/or updated from plays performed by players of one or more real sporting events. The fantasy sports game can include a time element, where the results can be outputted and observed in various ways, where the game situation can advance at varying speeds, including faster than real time. The game situation can also advance without active participation by the user(s), where one or more fantasy teams can be formed before the fantasy game(s) begin. The fantasy sports games can also proceed without any injury/ejection downside due to the user(s) not having to make any start/sit decisions.

The present technology provides the user(s) an experience which is familiar to a spectator of a real sporting event, where game flow is a product of actual plays from one or more real sporting events. While certain fantasy sports can currently be volume driven, the present technology can be efficiency driven. For example, in other fantasy sports, a user having a fantasy team would want a player to have maximum playing time, such as a quarterback that passes as much as possible to increase the likelihood of yards and touchdowns with disregard for incompletions; whereas, in the present technology, incompletions cost the team a down so completion percentage is elevated in importance. Other fantasy sports can also be the product of a set of sum totals, while the present technology can be a tapestry of plays executed contextually. For example, in certain fantasy games, a 5 yard gain on 1st and 10 and 3rd and 4 are essentially the same, whereas in the present technology, the latter moves the chains for a first down. Scoring in other fantasy games likewise gives a result, while the present technology instead tells a story through a "play" oriented game flow which mirrors the in-game or on-field product. As another comparison, other fantasy games can have fractional point scoring that is tabulated in a spreadsheet, whereas the present technology turns plays into a narrative that is sharable and lends itself to the social media culture of today. The present technology can therefore provide an exciting complement to other fantasy games and can provide an entry point for underrepresented demographics while creating an alternative for existing fantasy sports players.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1B shows a second portion of the fantasy football method flow chart in accordance with the present technology.

FIG. 2A shows a first set of priorities assigned to a first plurality of players and and the outcome of an injury occurring to one of the players in changing the priorities.

FIG. 2B shows a first set of priorities assigned to a first plurality of players and and the outcome of an injury occurring to another one of the players in changing the priorities.

FIG. 3B shows an example of assembling a second play portfolio for a second plurality of players for a second fantasy team.

FIG. 4A shows a selected play and how executing the play advances the game situation and how the game situation is updated.

FIG. 5 shows a real sporting event scenario is used to identify similarity with the fantasy sporting event to determine which play is selected and executed in the fantasy game with the outcome thereof applied to advance and update the fantasy game situation.

FIG. 6 shows a tabular depiction of how players are utilized in a fantasy basketball game according the present technology, where dark boxes indicate the players which are on the floor for the fantasy game and lighter boxes indicate that the player was on the floor in the real game, but not the fantasy game.

FIG. 7A shows a first portion of a fantasy basketball method flow chart in accordance with the present technology.

FIG. 7B shows a second portion of the fantasy basketball method flow chart in accordance with the present technology.

DETAILED DESCRIPTION

Figure 1A:
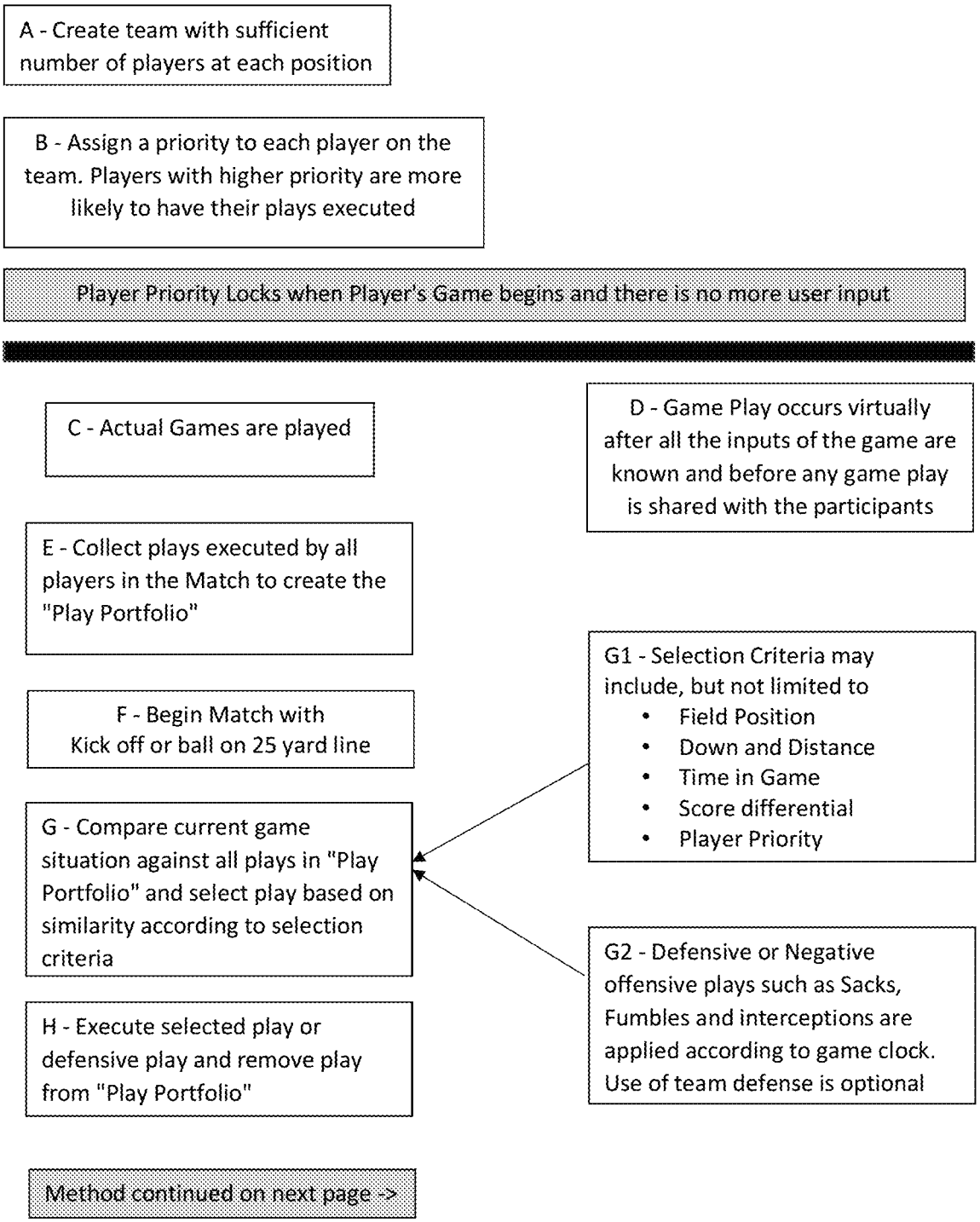
FIG. 1A shows a first portion of a fantasy football method flow chart in accordance with the present technology.
Figure 3A:
FIG. 3A shows an example of assembling a first play portfolio for a first plurality of players for a first fantasy team.
Figure 4B:
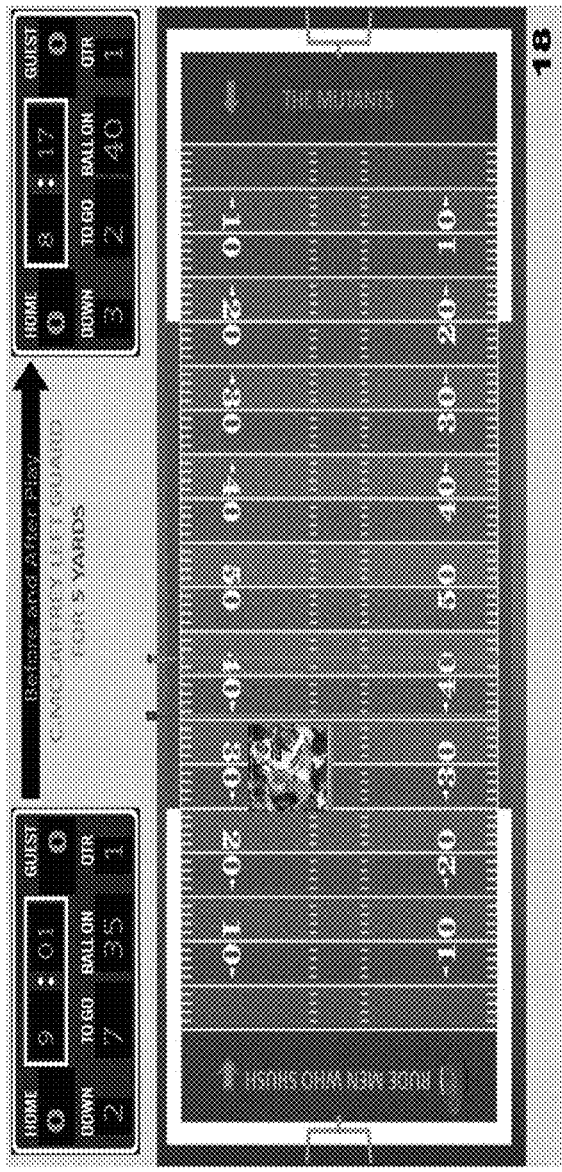
FIG. 4B shows another selected play and how executing the play advances the game situation and how the game situation is updated.
Figure 4C:
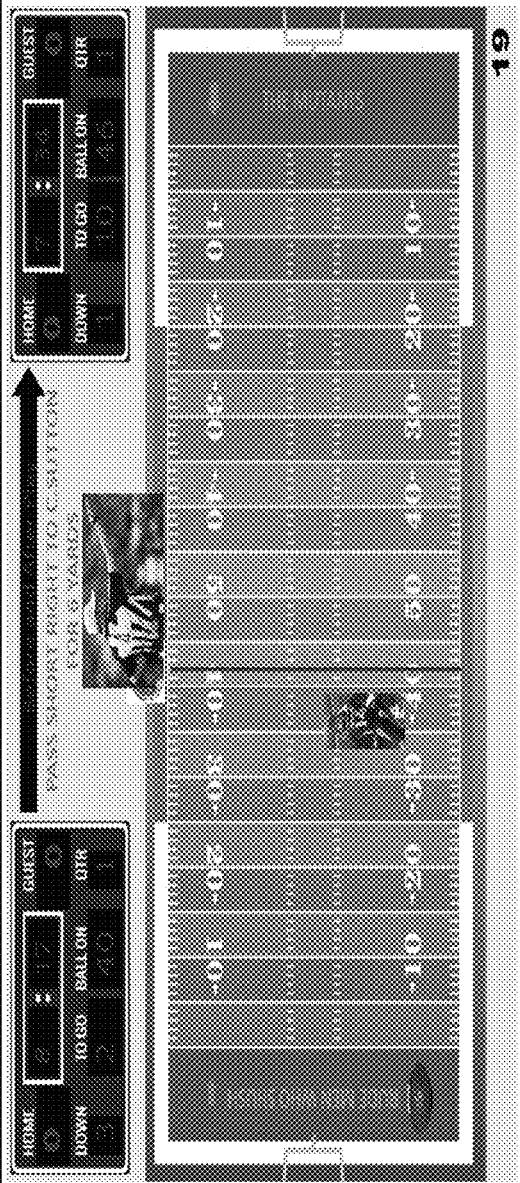
FIG. 4C shows yet another selected play and how executing the play advances the game situation and how the game situation is updated.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments. As used herein, the term "and/or" includes any and all combinations of one or more of the associated listed items.

The present technology relates to conducting a fantasy sports game, including methods of such, non-transitory computer-readable medium having stored thereon computer-readable instructions that when executed by a computing device cause the computing device to implement such methods, and computing devices configured to operate such methods. Particular aspects of conducting a fantasy sports game include at least the following three steps. First, a fantasy sporting event is performed by comparing a game situation with a first play portfolio and selecting a play from the first play portfolio based upon first selection criteria, the first play portfolio based upon a first plurality of plays performed by a first plurality of players of one or more real sporting events, and the first selection criteria including a first set of priorities assigned to the first plurality of players and a statistic of the play. Second, the selected play from the first play portfolio is executed to advance the game situation based upon the selected play and update the game situation. Third, the selected play is redacted from the first play portfolio. The first, second, and third steps are then repeated to continue to advance the game situation based upon another selected play from the first play portfolio, update the game situation, and redact the another selected play from the first play portfolio until a predetermined event occurs.

In certain embodiments, prior to the first step, the method can further include assigning, by a first user, the first set of priorities to the first plurality of players, the first plurality of players being on a first fantasy team. Data corresponding to the first plurality of plays performed by the first plurality of players of the one or more real sporting events can also be received to create the first play portfolio. The first fantasy team can be created by having the first user select the first plurality of players on the first fantasy team. Moreover, creation of the first fantasy team by having the first user select the first plurality players on the first fantasy team can include creating a plurality of fantasy teams by having a plurality of users select a plurality of players on the plurality of fantasy teams. Assigning the first set of priorities can further include assigning, by a plurality of users, a plurality of sets of priorities to a plurality of players on a plurality of fantasy teams, each of the plurality of players corresponding to a plurality of players of one or more real sporting events.

Priorities assigned by the first user to the first plurality of players on the first fantasy team, or by multiple users to multiple players on multiple fantasy teams, can be accomplished in various ways. For example, priorities assigned by the first user to the first plurality of players on the first fantasy team can include ordering the first plurality of players from a highest priority to a lowest priority. That is, the priorities can be sequential without any ties or redundancies. In a particular embodiment, an offensive lineup in a fantasy football game can assign priorities to ten players using the numbers 1 through 10, where 1 indicates the highest priority and 10 indicates the lowest priority. In other embodiments, the assignment of priorities can include one or more equivalent priorities that include some rule as to how a tie is to be broken. A statistic of a play can be used as a tie breaker, for example. As one particular example, two players can be assigned equivalent priorities, but a tie breaking rule can result in one of the players having priority in third down and under 3 yards to go situations.

In creating and updating the play portfolio, it is possible that the receiving step can include where the first play portfolio replaces a previous play portfolio, the previous play portfolio based upon receiving previous data corresponding to a plurality of plays performed by the first plurality of players of one or more previous real sporting events to create the previous play portfolio. In this way, successive fantasy sports games can progress through a season based upon a season of real sporting events; e.g., data from successive weeks of real sporting events can update the play portfolio to base the fantasy sports game on the players of the real sporting events, which may change during a season, and plays the players actually execute in the real sporting events. For example, the play of certain players of real sporting events can improve (e.g., a player has a breakout game) from game-to-game or week-to-week and the play of certain players of real sporting events can decrease (e.g., injury) from game-to-game or week-to-week.

Conducting a fantasy sports game using the present technology can also include performing a plurality of fantasy sporting events, where each fantasy sporting event is performed by comparing a game situation with a plurality of play portfolios and selecting a play from the plurality of play portfolios based upon a plurality of selection criteria, the plurality of selection criteria including a plurality of sets of priorities assigned to the plurality of players and a statistic of the play. A whole league or division of fantasy sporting events can be carried out in this manner. Multiple fantasy sports teams setting up a fantasy sports league or division can follow players in a league or division of one or more real sporting events in a substantially contemporaneous fashion. Alternatively, the fantasy sports game can be part of a league or division that conducts fantasy sporting events between non-contemporaneous real sporting events. For example, it is possible to conduct one or more fantasy sports games between fantasy teams formed of players and play portfolios from different years or a mixture of years of real sporting events. That is, a fantasy sports team can be created using players of one or more real sporting events from the 1970's and pitted against another fantasy sports team created using players of one or more real sporting events from the 2010's.

As described above, the fantasy sporting event is preformed by comparing the game situation with the first play portfolio and selecting a play from the first play portfolio based upon first selection criteria. The game situation can advance during successive iterations of the first, second, and third steps. For example, as a selected play is executed, various aspects of the fantasy sporting event can change. Where the fantasy game is based upon football, for example, gain/loss of yards, downs, play time and game time, a scoring event, and/or a change of possession can occur. Particular embodiments include where the game situation includes parameters particular to the nature of the fantasy sport, which for football can include one or more of a field position, a down and distance, a game time, and a score differential, which for baseball can include one or more of an inning, runs, pitch count, and number of outs, and which for basketball can include one or more of two-point baskets, three-point baskets, a game time, score, and court position.

Various aspects can contribute to selecting a play from the first play portfolio based upon first selection criteria, as part of performing the first step identified herein. In particular, the first step can include determining a plurality of fits between the game situation and the statistics of the plays from the first play portfolio and selecting the play from the plurality of fits based upon the first set of priorities assigned to the first plurality of players available in the plurality of fits. For example, the plurality of fits can include statistical matching between the game situation and the statistics of the plays from the play portfolio to rank the plays from the closest match to the game situation to the least similar play to the game situation. The ranked plays can then be weighted with the priorities of the assigned to the players to select the play from the play portfolio. In certain embodiments, the priorities of the players and the ranked statistics of the plays can be equally weighted and combined to ascertain which play of the play portfolio is selected. Other embodiments can include a weight or emphasis on matching the game situation and the statistics of the plays from the play portfolio followed by using the set of priorities to break any ties between plays by different players. It is also possible to weight or emphasize the set of priorities assigned to the players and then select the play based upon a similarity of the game situation to a play statistic. Still further embodiments can select a play from the first play portfolio based upon first selection criteria by matching a first aspect of the game situation with a first aspect of the plays in the play portfolio, followed by matching a second aspect of the game situation with a second aspect of the plays in the play portfolio, and so on. Such aspects can include a field position, a down and distance, a game time, a score differential, among other statistics of the plays.

In certain embodiments, the first instance of the first step can include using a starting situation as the game situation, where the starting situation can include a member selected from the group consisting of a starting field position and a game time. For example, the starting situation can correspond to a beginning of the game, a beginning of another game period, quarter, or half, a beginning of overtime, etc. As another example, the starting situation can include a starting field position dictated by a predetermined field position; e.g., starting on the 25 yard line. As yet another example, the starting situation can include a game time and correspond only to plays at that particular game time; e.g., the beginning of the game, the beginning of the second half, the beginning of overtime, etc.

In conducting a fantasy sports game according to the present technology, an output can be provided of a result of the execution of the selected play from the first play portfolio, which advances the game situation based upon the selected play and updates the game situation. For example, the result can be output to one or more users to provide a sequence or flow of the fantasy game, where the output can provide entertainment to the users as the fantasy sporting event unfolds. The output can take various forms, including one or more of displaying a graphic, displaying an animation, playing an audio file, and displaying a video file. For example, scoring graphics and sounds can be provided as output, and where video of plays performed by players of the one or more real sporting events exists, video clips of the corresponding plays or of similar plays can be shown.

Various aspects of redacting the selected play from the first play portfolio in the third step of the present technology can include redacting all plays performed by a player from the first play portfolio when the selected play in the first step identifies an injury to the player. In this way, further performance of the fantasy sporting event can simulate the loss that particular player on the outcome of the fantasy sports game. In conjunction with redacting all plays performed by a player from the first play portfolio when the selected play in the first step identifies an injury to the player, the method can include changing one or more priorities of the first set of priorities assigned to the players. The change in one or more priorities can include removing a priority or priority ranking from the injured player and/or can include reassigning the injured player's priority to another player of the same position. For example, the priority of a running back can be reassigned to another running back following an injury event to the first running back.

In certain embodiments, the first, second, and third steps as described herein are repeated until one or more predetermined events occur. For example, the iterative process can simulate a possession of the first fantasy team until the predetermined event occurs. Examples of such predetermined events include a scoring event, a turnover, a change of possession, an end of a game period, a halftime of the game, an expiration of game time, amongst others. It is possible to restart the first, second, and third steps for an opposing team and continue the fantasy sports game. In fact, the two fantasy teams can alternate between iterations of the first, second, and third steps until the game situation plays out a complete fantasy sports game.

In view of an opposing team and more than one user participating in the fantasy sports game, one or more of the following aspects can be included when conducting the fantasy sports game. A second user can assign a second set of priorities to a second plurality of players on a second fantasy team, where the second plurality of players correspond to a second plurality of players of one or more real sporting events. Data corresponding to a second plurality of plays performed by the second plurality of players of the one or more real sporting events can be received to create a second play portfolio. The following primary, secondary, and tertiary steps can be performed, which operate in a similar fashion to the first, second, and third steps described above. The primary step can include performing the fantasy sporting event by comparing the game situation with the second play portfolio and selecting a play from the second play portfolio based upon second selection criteria, the second selection criteria including the second set of priorities assigned to the second plurality of players and a statistic of the play. The secondary step can include executing the selected play from the second play portfolio to advance the game situation based upon the selected play and update the game situation. The tertiary step can include redacting the selected play from the second play portfolio. The primary, secondary, and tertiary steps can be repeated to continue to advance the game situation based upon another selected play from the second play portfolio, update the game situation, and redact the another selected play from the second play portfolio until a second predetermined event occurs. Certain embodiments further include where each of the first predetermined event and the second predetermined event independently include a scoring event, a turnover, a change of possession, an end of a game period, a halftime of the game, or an expiration of game time. It is also possible to create the second fantasy team by having the second user select the second plurality of players on the second fantasy team.

Additional aspects of the present technology include various articles of manufacture. In certain embodiments, a non-transitory computer-readable medium is provided that has stored thereon computer-readable instructions that when executed by a computing device cause the computing device to implement a method of conducting a fantasy sports game as described herein. In some embodiments, a computing device is provided that includes a processor and a non-transitory computer-readable medium operably coupled to the processor, where the computer-readable medium has stored thereon computer-readable instructions that when executed by the processor cause the computing device to implement a method of conducting a fantasy sports game as described herein.

Additional aspects of conducting a fantasy sports game can be understood by reference to the following examples. Each fantasy sports game can be head-to-head with each user having a roster of players with defined positions. For each match, the users can prioritize their players within the defined positions. The priority of each player can be locked once the one or more real sporting events begin. The one or more real sporting events can be allowed to occur and one or more statistics of plays can be collected, received, and associated with each player on the fantasy team. Each play can be catalogued with a scenario (e.g., play or down, distance to gain, yards to goal, etc.) and can be time stamped within the game with duration and outcome. Each user's team can then include an associated play portfolio that is an aggregation of the plays made by the players on the respective fantasy team roster.

After all of the actual games are completed, the fantasy sports game can be conducted in the fashion similar to how the real sporting event is played. Each team can make plays that are based on the respective play portfolio formed of plays performed by offensive players of one or more real sporting events, which can also include plays performed by defense/special teams as applicable for the particular sport. In certain embodiments, users do not have any control of game play. Instead, plays are executed from the respective portfolio based on predefined selection criteria, including matching the current game scenario. As plays are executed, time is reduced from the clock and the play flows as it normally would in the sport. For example, in football, plays gain yards and subsequently first downs as offenses move across a virtual field. If a team fails to convert a first down after three downs, they would either go for it on 4th down or punt to change possession to the other team, depending on field position, down, and distance. In baseball, three outs in an inning would send the other team up to bat. In basketball, a made shot, a missed shot with a defensive rebound, or a turnover would result in the other team gaining possession. Scoring in the fantasy sports game can be similar, equivalent, or exactly the same as the actual sporting event, including scoring based on the one or more real sporting events. For example, a touch down can be scored when a fantasy team executes a play that reaches the goal line, a basketball game can be scored by made 2 point, 3 point, or free throw baskets, and a baseball game can be based on runs scored. The fantasy sports game is played out until there is no time left on the clock, or no innings left in the game, unless there is a tie at the end of regulation. In the event of a tie, play can continue into overtime until a winner is determined. The winner can be the highest scoring team based on the game play; e.g., points for basketball and football and runs for baseball. A full game summary with box score, play by play, and highlight video can be output for one or more users to experience the fantasy sports game and learn the winner of the contest.

The following aspects can be part of one or more user's experiences in conducting a fantasy sports game based upon the present technology. One or more users can draft fantasy teams, assign priorities to players on the fantasy team's roster prior to the players of one or more real sporting events playing actual games. After the actual games are played, data corresponding to the plays performed by the players of the one or more real sporting events can be received or obtained to create the necessary play portfolios; e.g., plays by players and associated statistics of the plays by the players are available Tuesdays for NFL football. Because the data received are based on events that have already occurred, the data corresponding to the plays performed by the players of the one or more real sporting events may be referred to herein as "historical data." Similarly, the associated statistics of the plays performed by the players may be referred to herein as "historical statistics." As the method is conducted, or at a point thereafter following completion of the method, the one or more users can experience output of the game play out where a winner can be determined.

Various types of events in various types of sports can be considered a "play," with respect to the present technology. For example, football plays can be categorized as: Pass (completion/incompletion/interception/air yards), Rush (fumble, yards, touchdown), Reception (target, Fumble, yards after completion, touchdown), Pass interference drawn, Team Defense/Special Team Plays (interception, fumble recovery, touchdown, kick return), etc. Basketball plays can be categorized as: Shot (make, miss, 2 pt, 3 pt, foul), Assist, Turnover, Foul committed, Foul Drawn, Rebound), etc. Baseball plays can be categorized as: Result of Plate Appearance, Pitcher (strike out, BB, HBP), Error committed, etc.

Selection criteria for offensive plays can include the following aspects. Users can assign a priority for each player on their fantasy team roster. Higher priority players are more likely to have their full set of plays executed within a game. Therefore, the user should identify players they predict will perform the best as the highest priority. Plays are executed in the game based upon plays collected into the respective play portfolio based on predetermined selection criterion. In certain embodiments of conducting the fantasy sports game, users may not provide any input during the game play. There can be two different sets of selection criteria. The first selection criterion can be utilized from the start of the game until the end of the third quarter. The second selection criterion can utilized in the fourth quarter and overtime, for example.

Each criterion is further explained as follows. The first selection criterion (in the example of football) can be active in the first quarter through the third quarter play selection, which can include player priority and one or more statistics of a play; e.g., yard line, down and distance, time in the game, etc. The traditional offensive strategy for the first three quarters of a football game is to maximize scoring. Teams are not typically in the situation where they are already protecting large leads or pressing to catch up. Therefore, the first selection criterion is used for the first three quarters and only selects plays run in the first three quarters from the play portfolio. Such selection criterion can be broken down as follows:

a. Down and Distance—It is important to the simulation that the players in the actual game, upon which the play portfolio in the fantasy sports game is based, are trying to accomplish similar goals for the scenario. For example, 3rd and 3 yards calls for a different play than 3rd and 12 yards. Furthermore, 1st and 10 yards often has a different aim than 3rd and 10 yards. 1st and 2nd downs are considered more interchangeable than 3rd down plays, since failure on 3rd down usually results in punting the ball to the other team. 1st and 2nd down play selection will endeavor to match the distance as much as possible. 3rd down play selection will endeavor to have distance greater than or equal.

b. Time in Game—If two plays from the portfolio have identical applicability for down and distance, than the criterion will select the play which was executed more near to the same time of game. The selection is for a play in the 1st quarter and there are two plays which are a match, one which the play was actually run in the 1st quarter and the other which was run in the 3rd quarter. The process will select the play run in the 1st quarter.

c. Yard line—The field can be divided into five sections when considering how yard line impacts play selection. Considering the yards being numbered from zero to 100 from a team's end zone to the opponent's end zone:

d. Scrimmage Zone 1: 0 to 10 yards—Danger of being sacked e. Scrimmage Zone 2: 11 to 50 yards—Far from end zone allows the possibility of very long gain play which could result in wasted yardage if executed in Zone 3, 4 or 5 f. Scrimmage Zone 3: 51 to 79 yards—Opponent's territory g. Scrimmage Zone 4: 80 to 94 yards—Red Zone h. Scrimmage Zone 5: 95 to 100 yards—Short to Goal i. Player Positional Priority—Players with higher positional priority will have their plays selected first to ensure they all contribute to the game play.

The second selection criterion can be used in the fourth quarter and/or in overtime play selection as follows:

a. Score is factored along with Player Positional Priority, yard line, down and distance, and time in the game.

b. Leftover plays from the first, second, and third quarter may still be executed in the fourth quarter, but additional emphasis is put on the score of the game.

c. If fantasy team is winning by a predetermined point total (e.g., two touchdowns or more) in the fourth quarter or a predetermined number of scoring events (e.g., two scores) inside of a predetermined amount of game time (e.g., the final four minutes), priority can shift toward plays that were executed with a lead. This is because teams which are winning in the fourth quarter tend to select lower risk plays, such as runs, to protect the lead. If a fantasy team is losing by a predetermined point total (e.g., two touchdowns or more) or more in the fourth quarter or a predetermined number of scoring events (e.g., two scores) inside of a predetermined amount of game time (e.g., the final four minutes), priority can shift toward plays that were executed when trailing. This is because teams that are losing in the fourth quarter tend to select plays which will gain more yards to attempt to get back into the game.

Conducting a fantasy sports game can also include providing a bonus condition. For example, when a rush or reception results in a touchdown, the play can be considered to accrue the yardage plus a defined touchdown bonus yardage; for example, a one yard touchdown run can be cataloged as a 31 yard run in terms of advancing the game situation. A 26 yard touchdown reception can be cataloged as a 56 yard reception in terms of advancing the game situation. If the yardage is enough to extend the team into the endzone based on current field position, then a touchdown is awarded. Such bonus conditions can be designated for all or for certain players on the fantasy team.

Where the fantasy sports game is based upon football, quarterback pass performance can be an important consideration. Quarterbacks in fantasy football can accrue many yards, but typically the yardage is to a player (e.g., wide receiver) that may not be on the same fantasy team. In order to allow the quarterback to contribute passing yardage to the fantasy team without counting the efforts of the receiver once the ball is caught, air yards can be considered in advancing the game situation. Air yards can be related to the distance the ball traveled in the air, measured from the line of scrimmage, at the time the receiver caught the ball for a given play in the play portfolio. If the ball is caught in the endzone, the quarterback can earn a touchdown bonus; e.g., a bonus condition can apply. The only scenario where yards after catch is attributed to the quarterback play is when the pass is completed less than the yards to gain. The quarterback can be credited with all yards after a catch less than the distance to gain, and if the receiver accumulates enough yards to make a first down, the quarterback play can be recorded as the yards-to-go plus 1 yard. The purpose of this rule can be demonstrated through the use of a screen pass. A screen pass is designed to be a short pass in which the offense sets up blocking to exploit a catch-and-run play. The air yards for this type of pass are many times zero or one yard, but such plays are often successful in gaining many more yards.

Injuries that occur in a play to a player in one or more real sporting events can have several impacts. As described, all plays performed by a player can be redacted from the play portfolio when the selected play identifies an injury to the player. Conducting the fantasy sports game to account for injuries provides a game element absent from other ways of conducting fantasy sports games. In many sports, it is common that a player can be injured during a game and is designated as "Will Not Return". In such a case, the injured player contributes their plays to the game up until the time in the game of the injury. For example, plays made by the player are used to advance the game situation until the play including the injury to the player is selected from the play portfolio. At the time of injury, all plays by the player can be removed from the play portfolio. In addition, one or more players for that position with lower priority than the injured player can be elevated in priority. The play selection is updated based on the updated priority for the remainder of the game. This process can be carried out for every injury which occurs within the fantasy sports game. Conducting the fantasy sports game to account for injuries in the present technology can avoid instances that arise in other fantasy sports games where a fantasy starting player gets injured and contributes fewer points than if the player played a full game.

In conducting a fantasy sports game based upon football, turnovers can be incorporated to affect the outcome. Each turnover in a football game can be recorded as a positive statistic for a fantasy team's defense and a negative statistic for a fantasy team's offense. The present technology can be implemented with fantasy teams including two sets of offenses and two sets of defenses, but the amount of turnovers in a match must represent only one football game's worth of turnovers. As an example, consider two fantasy teams, one completely made up of Cleveland Browns offensive players and the Cleveland Browns defense/special teams, while the other team is completely made up of Pittsburgh Steelers offensive players and Pittsburgh Steelers defense/special teams. In the real sporting events conducted by the players on these teams, each quarterback threw one interception and each team had two fumbles by receivers and running backs. Therefore, there were a total of six turnovers in the game. If all of the stats were executed for offense and defense, then a total of twelve turnovers would be executed in the game because each turnover is associated both with the position player committing the turnover and the defense who caused the turnover. Considering this example, it is clear that turnovers can be split between the contribution by the offensive position players and the defensive position players. The same is true for sacks since the negative play can be associated with the quarterback. As such, comparing a game situation, selecting a play from the first play portfolio, executing the selected play from the first play portfolio to advance the game situation based upon the selected play and update the game situation, redacting the selected play from the first play portfolio of the first, second, and third steps of the present technology can incorporate rules limiting the amount of turnovers that may occur; e.g., the turnover instances can be limited to half the number in the real sporting events or a selected number of plays resulting in a turnover can be randomly redacted from the respective play portfolios.

Certain aspects can be incorporate with respect to defense turnovers. For example, only the odd number turnovers are contributed to the play portfolio. Accordingly, the first, third, fifth, and so on turnovers can be utilized in the play portfolio, or when selected, can be executed to advance the game situation. The even number turnovers such as the second, fourth, sixth, and so can be removed from the play portfolios, or when selected, can be passed over for the next selection based upon the selection criteria. Turnovers often result in return yards by the defense; therefore, the more successful of the paired odd and even turnover plays (e.g, considering yards and a touchdown bonus) can be associated with the turnover in the play portfolio.

EXAMPLE

Turnover ONE: Fumble recovery; 0 yard return
Turnover TWO: INT 23 yard return
Turnover THREE: INT 6 yard return AND TD
Turnover FOUR: Fumble recovery 23 yard return
Turnover FIVE: INT 35 yard return The game can therefore utilize Turnover TWO, Turnover THREE, and Turnover FIVE, while turnover ONE and turnover FOUR are discarded and do not impact the fantasy sports game.

With further respect to plays by certain players in the play portfolios, player turnovers (e.g., fumbles and interceptions) can only considered for players having certain priorities. For example, turnovers may be considered only for the highest priority quarterback, the two highest priority running backs, the two highest priority receivers, and the highest priority tight end. Only the even number player turnovers can be contributed to the play portfolio. Therefore, the second, fourth, sixth, and so on turnovers are utilized, while odd number player turnovers such as first, third, fifth, and so on are not. No return yards or touchdowns are associated with player turnovers. The odd discarded player turnovers can still be represented in the play portfolio in another ways, such as by a neutral play which utilizes a down; e.g., quarterback incompletion, running back rush for zero yards, receiver dropped pass.

The present technology can also incorporate certain rules and aspects in consideration of defensive sacks. In a fashion similar to turnovers, sacks can also be considered a positive play for the defense and negative play for the quarterback. Sacks can be considered in the same manner as turnovers with the odd numbered defensive sacks removed from the play portfolio or passed over when selected, and the even numbered quarterback sacks used. The same process for yards lost can be used for sacks with the exception that negative yards can be associated with the quarterback sacks, the lesser of the yards from the pair. The odd discarded quarterback sacks can still represented in the play portfolio as an incompletion, which utilizes a down. A sack which results in a turnover can also not be considered two separate plays. Such a play can be considered only as a turnover.

Defensive plays and a defensive portion of a play portfolio can include several considerations. Defensive play selection, which can include positional player turnovers and sacks, can take turnovers caused by defense and game situation factors, including game time and field position, into consideration. Depending on the game time, the defensive turnover an be eligible to be executed starting 1 minute prior to the game time when the play actually happened. Depending on the field position, a position on the field where the turnover occurred can be important since it has input into where the offense will start after the turnover. Therefore, the position on the field where the ball was snapped is a consideration on when the play will be executed. The field can be divided into zones as follows: A (yards 0 to 30), B (yards 30 to 70), and C (yards 70 to 100) in a particular direction for a particular team. The zones can be oppositely ordered for the opposing team. A defensive turnover can be executed on the first play ran in the respective zone, from one minute before the turnover onwards. A turnover committed by a certain player can be executed based on normal selection criteria. Defensive and quarterback sacks can be executed on the first play ran on the same down, from one minute before the sack onwards. Various game settings can also impact the game conditions and play portfolio. These settings include duration of actual play (e.g., a fantasy sports game can be conducted for a week of a football season or a three day period of the basketball season) where a user can assign a set of priorities to the players on the fantasy team between one or more real sporting events, allowing the play portfolio to be updated as a schedule of the one or more real sporting events are played through the season.

As described, ways of conducting a fantasy sports game provided herein can perform a fantasy sporting event by comparing a game situation with a first play portfolio and selecting a play from the first play portfolio based upon first selection criteria. The first selection criteria can include a first set of priorities assigned to the first plurality of players and a statistic of the play. The following examples are based upon conducting a fantasy football game and are designed to demonstrate workflows that can be applied to assigning the first set of priorities to the first plurality of players and to selecting a play from the first play portfolio based upon first selection criteria. The abbreviations used herein refer to football player positions recognized by those skilled in the art; e.g., quarter back (QB), running back (RB), wide receiver (WR), tight end (TE), etc.

One embodiment titled "Filtering Selection Criteria Process" is provided as follows.

Guide for Setting Player Priority before Contest
1,2,3,4,5->ONE RB, THREE WR, ONE TE
6->ONE QB
7,8,9,10,11->ANY RB, WR, TE at least one of each
12->ONE QB
13,14,15,16,17->ANY RB, WR, TE
18->ONE QB Before entering Selection Criteria Process, determine if a Turnover or Sack must be executed.

A. Turnovers are executed on the first play run in the corresponding Turnover Zone, starting 60 seconds before the game time of the turnover.

B. Sacks are executed on the first play ran on the same down, starting one minute before the game time of the sack.

T1—1st and X to Go at game time Y in Scrimmage Zone Z

1. Filter Only "$1^{st}$ Down" Plays
2. Filter "To Go" to X+/−1 yards
3. Filter including only plays in same Scrimmage Zone Z
4. Filter including only plays with game time Y+/−60 seconds
5. Filter Player Priority to ONE through SIX and choose Play from Player with highest Priority, if no plays match these filters continue to step 6
6. Filter game time to Y+120/−120 seconds, choose Play from Player with highest Priority, if no match, continue to expand Y by 60 seconds in both directions until full game is considered. If at any time interval a play or plays matches, choose Play from Player with highest Priority, if no play matches continue to step 7
7. Filter to include "To Go" to X+20/−1. Choose Play with "To Go" closest to X, break ties based on Play Priority. If no match, continue to step 8
8. Return to Step 3, but include Plays from Scrimmage Zone Z, Z+1 and Z−1. Proceed to follow steps 4 through 7. If no match, continue to step 9
9. Return to Step 1, but include "$2^{nd}$ Down" Plays. Proceed to follow steps 2 through 8.

T2—2nd and X to go at game time Y in Scrimmage Zone Z

1. Filter Only "2nd Down" Plays
2. Filter "To Go" to X+1/−0 yards
3. Filter including only plays in same Scrimmage Zone Z
4. Filter including only plays with game time Y+/−60 seconds
5. Filter Player Priority to ONE through SIX and choose Play from Player with highest Priority, if no plays match these filters continue to step 6
6. Filter game time to Y+120/−120 seconds, choose Play from Player with highest Priority, if no match, continue to expand Y by 60 seconds in both directions and check for matches at +180/−180 and +240/−240, if no match continue to step 7
7. Filter "To Go" to X+1/−1 choose Play from Player with highest Priority, if no plays match continue to step 6
8. Continue to expand Y by 60 seconds in both directions until full game is considered. If at any time interval a play or plays matches, choose Play from Player with highest Priority, if no play matches continue to step 9
9. Return to step 7, but Filter "To Go" to X+2/−2 and continue through step 8. If no play matches continue to step 10
10. Return to step 3, but Filter to include Scrimmage Zone Z−1, Z and Z+1. Continue through step 9. If no play matches continue to step 11
11. Return to Step 7, but Filter X+20/−3, Choose Play with "To Go" closest to X, break ties based on Play Priority. Continue through step 10.

T3—3rd and X to go at game time Y in Scrimmage Zone Z

1. Filter Only "3rd Down" Plays
2. Filter "To Go" to X yards
3. Filter including only plays in same Scrimmage Zone Z
4. Filter including only plays with game time Y+/−60 seconds
5. Filter Player Priority to ONE through SIX and choose Play from Player with highest Priority, if no plays match these filters continue to step 6
6. Filter game time to Y+120/−120 seconds, choose Play from Player with highest Priority, if no match, continue to expand Y by 60 seconds in both directions and check for matches at +180/−180 and +240/−240, if no match continue to step 7
7. Filter "To Go' to X+1/−0 yards, choose Play from Player with highest Priority, if no match, continue to step 8
8. Continue to expand Y by 60 seconds in both directions until full game is considered. If at any time interval a play or plays matches, choose Play from Player with highest Priority, if no play matches continue to step 9
9. Return to step 7, but Filter "To Go" to X+2/−0 and continue through step 8. If no play matches continue to step 10
10. Return to step 3, but Filter to include Scrimmage Zone Z−1, Z and Z+1. Continue through step 9. If no play matches continue to step 11
11. Return to step 7, but Filter "To Go" to X+3/−0 and continue through step 8 and 10. If no play matches continue to step 12
12. Return to Step 7, but Filter X+6/−0, Choose Play with "To Go" closest to X, break ties based on Play Priority. Continue through step 10.

T4—4th and X to go at game time Y in Scrimmage Zone Z

1. Consult $4^{th}$ Down Chart (Table 1 below) to determine if team will Punt, kick a Field Goal or Attempt a Play. If the team punts or kicks a field goal, it is unnecessary to execute the selection process. If the team attempts a play continue to step 2

TABLE 1

| | Yard Line (Absolute) | | |
|---|---|---|---|
| | Punt | Go For It | Field Goal |
| 4th & 1 | 0-40 | 41-100 | |
| 4th & 2 | 0-40 | 41-100 | |
| 4th & 3 | 0-40; 96, 97 | 41-80 | 81-95 |
| 4th & 4 | 0-44 | 45-68 | 69-96 |
| 4th & 5 | 0-50 | 51-72 | 73-95 |
| 4th & 6 | 0-53 | 54-74 | 75-94 |
| 4th & 7 | 0-56 | 57-76 | 77-93 |
| 4th & 8 | 0-59 | 60-64 | 65-92 |
| 4th & 9+ | 0-62 | | 63-91 |

2. Filter Only "4th Down" Plays
3. Filter "To Go" to X yards
4. Filter including only plays in same Scrimmage Zone Z
5. Filter including only plays with game time Y+/−60 seconds
6. Filter Player Priority to ONE through SIX and choose Play from Player with highest Priority, if no plays match these filters continue to step 7
7. Filter game time to Y+120/−120 seconds, choose Play from Player with highest Priority, if no match, continue to expand Y by 60 seconds in both directions and check for matches at +720/−720, if no match continue to step 8
8. Return to Step 5, but filter "To Go" to X+1/−0 and continue through steps 7, if not match continue to step 9
9. Continue to expand Y by 60 seconds in both directions until full game is considered. If at any time interval a play or plays matches, choose Play from Player with highest Priority, if no play matches continue to step 10
10. Return to step 3, but Filter to include All Scrimmage Zones and "To Go" to X yards. Continue through step 9. If no play matches continue to step 11
11. Return to step 2, but Filter to include "$3^{rd}$ Down" and "$4^{th}$ Down" Plays. Continue through step 10. If no play matches continue to step 12
12. If a $3^{rd}$ or $4^{th}$ down play with "To Go" of X+2 or more exists in play portfolio considering all Scrimmage Zones and full game, pick play which is closest to X, breaking ties considering priority, and execute. If none exists, execute $3^{rd}$ or $4^{th}$ down play with "To Go" of X−1 or less which is closest to X, breaking ties considering priority. One or more of the following conditions can be considered:
1. If losing by TWO touchdowns or more in the fourth quarter or TWO scores inside of the final FOUR minutes insert following step into each down process and consider first: Filter to only plays executed when team was either losing by TWO touchdowns in the fourth quarter or TWO scores inside of the final FOUR minutes and include all Player Priorities. If no plays match when only considering plays executed while losing, then identify a matching play using the normal process.
2. If winning by TWO touchdowns or more in the fourth quarter or TWO scores inside of the final FOUR minutes insert following step into each down process and consider first: Filter to only plays executed when team was either winning by TWO touchdowns in the fourth quarter or TWO scores inside of the final FOUR minutes and include all Player Priorities. If no plays match when only considering plays executed while losing, then identify a matching play using the normal process.
3. If losing with SIX minutes or less in the fourth quarter, disregard plays run while the team was winning At the beginning of each quarter, starting with the $2^{nd}$ quarter, each team's first play executed in the quarter shall be the most successful play, in terms of yardage gained, from previous quarters which hasn't be executed yet, considering only Priority ONE to SIX. This is meant to ensure that successful plays are executed.

Another embodiment titled "Weighted Averages Selection Criteria Process" is provided as follows.

Guide for Setting Player Priority before Contest
1,2,3,4,5->ONE RB, THREE WR, ONE TE
6->ONE QB
7,8,9,10,11->ANY RB, WR, TE at least one of each
12->ONE QB
13,14,15,16,17->ANY RB, WR, TE
18->ONE QB Before Entering Selection Criteria Process determine if a Turnover or Sack must be executed.
A. Turnovers are executed on the first play run in the corresponding Turnover Zone, starting 60 seconds before the game time of the turnover.
B. Sacks are executed on the first play ran on the same down, starting one minute before the game time of the sack.

WA1—$1^{st}$ and X to Go at game time Y in Scrimmage Zone Z at Yard Line W
WA1 Down
$1^{st}$=1 $2^{nd}$=−1 $3^{rd}$ and $4^{th}$=−5
WA1 To Go
X=1
X+1 or X−1=0.5
X+2=0.25
X+3, X+4, X+5=−0.5
X+6, X+7, X+8, X+9, X+10=−1
X+11 to X+20=−2
All other=−5
WA1 Yard Line
W+2, W+1, W, W−2, W−1=1
W+6, W+5, W+4, W+3, W−6, W−5, W−4, W−3=0.8
W+10, W+9, W+8, W+7, W−10, W−9, W−8, W−7=0.7
Remaining inside the same Scrimmage Zone=0.5
Outside Same Scrimmage Zone=−0.5
WA1 Game Time
Y+30/−30 seconds=1
Y+30 to 60/−30 to 60 seconds=0.95
Y+60 to 120/−60 to 120=0.75
Y+120 to 180/−120 to 180=0.6
Y+180 to 240/−180 to 240=0.5
Y+240 to 480/−240 to 480=0
Y+480 to 960/−480 to −960=−0.25
Y+960 to 1920/−960 to −1920=−0.5
Y+1920 to 3600/−1920 to −3600=−0.75
Sum Score for WA1 Down, WA1 To Go, WA1 Yard Line and WA1 Game Time and divide by FOUR
Take the top THREE scores with Priority from ONE to SIX. Execute the play with the highest priority of the three with tiebreaker as highest similarity score.

WA2—2nd and X to Go at game time Y in Scrimmage Zone Z at Yard Line W
WA2 Down
$1^{st}$=−1
$2^{nd}$=1
$3^{rd}$ and $4^{th}$=−5
WA2 To Go
X=1
X+1=0.9
X−1=0.6
X+2=0.75
X−2=0.5
X+3=0
X+4=−0.5
X+5=−1
X+6=−1.5
X+7=−2
X+8=−2.5
All others=−5
WA2 Yard Line
W+2, W+1, W, W−2, W−1=1
W+6, W+5, W+4, W+3, W−6, W−5, W−4, W−3=0.8
W+10, W+9, W+8, W+7, W−10, W−9, W−8, W−7=0.7
Remaining inside the same Scrimmage Zone=0.5
Outside Same Scrimmage Zone=−0.5
WA2 Game Time
Y+30/−30 seconds=1

Y+30 to 60/−30 to 60 seconds=0.95
Y+60 to 120/−60 to 120=0.75
Y+120 to 180/−120 to 180=0.6
Y+180 to 240/−180 to 240=0.5
Y+240 to 480/−240 to 480=0
Y+480 to 960/−480 to 960 to 360=−0.25
Y+960 to 1920/−960 to 1920=−0.5
Y+1920 to 3600/−1920 3600=−0.75
Sum Score for WA2 Down, WA2 To Go, WA2 Yard Line and WA2 Game Time and divide by FOUR
Take the top THREE scores with Priority from ONE to SIX. Execute the play with the highest priority of the three with tiebreaker as highest similarity score.

WA3–3rd and X to Go at game time Y in Scrimmage Zone Z at Yard Line W
WA3 Down
$1^{st}$=−100
$2^{nd}$=−100
$3^{rd}$=1
$4^{th}$=−5
WA3 To Go
X=5
X+1=2.5
X+2=1.5
X+3=0.5
X+4=0
X+5=−1
X+6=−2.5
X+7=−3.5
X+8=−5
X−1=−10
X−2=−15
All others=−25
WA3 Yard Line
W+2, W+1, W, W−2, W−1=1
W+6, W+5, W+4, W+3, W−6, W−5, W−4, W−3=0.8
W+10, W+9, W+8, W+7, W−10, W−9, W−8, W−7=0.7
Remaining inside the same Scrimmage Zone=0.5
Outside Same Scrimmage Zone=−0.5
WA3 Game Time
Y+30/−30 seconds=1
Y+30 to 60/−30 to 60 seconds=0.95
Y+60 to 120/−60 to 120=0.75
Y+120 to 180/−120 to 180=0.6
Y+180 to 240/−180 to 240=0.5
Y+240 to 480/−240 to 480=0
Y+480 to 960/−480 to 960 to 360=−0.25
Y+960 to 1920/−960 to 1920=−0.5
Y+1920 to 3600/−1920 3600=−0.75
Sum Score for WA3 Down, WA3 To Go, WA3 Yard Line and WA3 Game Time and divide by FOUR
Take the top THREE scores with Priority from ONE to SIX. Execute the play with the highest priority of the three with tiebreaker as highest similarity score.

WA4—4th and X to Go at game time Y in Scrimmage Zone Z at Yard Line W Consult $4^{th}$ Down Chart (see Table 2 below) to determine if team will Punt, kick a Field Goal or Attempt a Play. If the team punts or kicks a field goal, it is unnecessary to execute the selection process. If the team attempts a play continue to the Weighted Average approach for $4^{th}$ down plays.

TABLE 2

| | Yard Line (Absolute) | | |
|---|---|---|---|
| | Punt | Go For It | Field Goal |
| 4th & 1 | 0-40 | 41-100 | |
| 4th & 2 | 0-40 | 41-100 | |
| 4th & 3 | 0-40; 96, 97 | 41-80 | 81-95 |
| 4th & 4 | 0-44 | 45-68 | 69-96 |
| 4th & 5 | 0-50 | 51-72 | 73-95 |
| 4th & 6 | 0-53 | 54-74 | 75-94 |
| 4th & 7 | 0-56 | 57-76 | 77-93 |
| 4th & 8 | 0-59 | 60-64 | 65-92 |
| 4th & 9+ | 0-62 | | 63-91 |

WA4 Down
$1^{st}$=−100
$2^{nd}$=−100
$3^{rd}$=−1
$4^{th}$=1
WA4 To Go
X=5
X+1=2.5
X+2=1
X+3=0
X+4=−2
X+5=−3
X+6=−4
X+7=−5
X+8 or more=−10
All others=−25
WA4 Yard Line
W+2, W+1, W, W−2, W−1=1
W+6, W+5, W+4, W+3, W−6, W−5, W−4, W−3=0.8
W+10, W+9, W+8, W+7, W−10, W−9, W−8, W−7=0.7
Remaining inside the same Scrimmage Zone=0.5
Outside Same Scrimmage Zone=−0.5
WA4 Game Time
Y+30/−30 seconds=1
Y+30 to 60/−30 to 60 seconds=0.95
Y+60 to 120/−60 to 120=0.75
Y+120 to 180/−120 to 180=0.6
Y+180 to 240/−180 to 240=0.5
Y+240 to 480/−240 to 480=0
Y+480 to 960/−480 to 960 to 360=−0.25
Y+960 to 1920/−960 to 1920=−0.5
Y+1920 to 3600/−1920 3600=−0.75
Sum Score for WA4 Down, WA4 To Go, WA4 Yard Line and WA4 Game Time and divide by FOUR
Take the top THREE scores with Priority from ONE to SIX. Execute the play with the highest priority of the three with tiebreaker as highest similarity score.

One or more of the following conditions can be considered:

1. If losing by TWO touchdowns or more in the fourth quarter or TWO scores inside of the final FOUR minutes insert following step into each down process and consider first: Filter to only plays executed when team was either losing by TWO touchdowns in the fourth quarter or TWO scores inside of the final FOUR minutes and include all Player Priorities. If no plays match when only considering plays executed while losing, then identify a matching play using the normal process.
2. If winning by TWO touchdowns or more in the fourth quarter or TWO scores inside of the final FOUR minutes insert following step into each down process and consider first: Filter to only plays executed when team was either winning by TWO touchdowns in the fourth quarter or TWO scores inside of the final FOUR minutes and include all Player Priorities. If no plays match when only considering plays executed while losing, then identify a matching play using the normal process.
3. If losing with SIX minutes or less in the fourth quarter, disregard plays run while the team was winning At the beginning of each quarter, starting with the $2^{nd}$ quarter, each team's first play executed in the quarter shall be the most successful play, in terms of yardage gained, from previous quarters which hasn't be executed yet, considering only Priority ONE to SIX. This is meant to ensure that successful plays are executed The following examples apply the Filtering Selection Criteria Process to identify selected play to apply to current fantasy game scenario. The Play Portfolio is compiled of 155 plays in total.

Current Fantasy Game Scenario—

$1^{st}$ and 10 to Go at game time 101 seconds (absolute game clock) at Yard Line 20

1. Filter Only "$1^{st}$ Down" Plays

After this step, 70 plays remain in consideration for selection (a subset of these plays is displayed below)

TABLE 3

First Down Plays

| Index | Quarter | Down | ToGo | YardLine | Yards Gained | Time Elapse | Absolute Time | Player | Priority |
|---|---|---|---|---|---|---|---|---|---|
| 1 | 1 | 1 | 10 | 25 | 0 | 5 | 0 | B. ROETHLISBERGER | 6 |
| 39 | 1 | 1 | 10 | 25 | 4 | 31 | 0 | C. MCCAFFREY | 1 |
| 66 | 1 | 1 | 10 | 20 | 4 | 41 | 5 | J. JACKSON | 2 |
| 104 | 1 | 1 | 10 | 58 | 6 | 28 | 101 | D. HENRY | 7 |
| 42 | 1 | 1 | 10 | 49 | 5 | 30 | 143 | C.MCCAFFREY | 1 |
| 4 | 1 | 1 | 10 | 67 | 4 | 28 | 170 | B. ROETHLISBERGER | 6 |
| 6 | 1 | 1 | 10 | 80 | 10 | 42 | 241 | B. ROETHLISBERGER | 6 |
| 106 | 1 | 1 | 10 | 25 | 5 | 39 | 272 | D. HENRY | 7 |
| 107 | 1 | 1 | 10 | 41 | 7 | 33 | 341 | D. HENRY | 7 |
| 67 | 1 | 1 | 10 | 30 | 3 | 40 | 358 | J. JACKSON | 2 |
| 109 | 1 | 1 | 10 | 54 | 3 | 31 | 415 | D. HENRY | 7 |
| 68 | 1 | 1 | 10 | 55 | 0 | 42 | 440 | J. JACKSON | 2 |
| 9 | 1 | 1 | 10 | 28 | 9 | 38 | 498 | B. ROETHLISBERGER | 6 |
| 43 | 1 | 1 | 10 | 42 | 2 | 35 | 523 | C. MCCAFFREY | 1 |
| 10 | 1 | 1 | 10 | 47 | −10 | 43 | 579 | B. ROETHLISBERGER | 6 |
| 111 | 1 | 1 | 10 | 81 | 5 | 29 | 600 | D. HENRY | 7 |
| 112 | 1 | 1 | 9 | 91 | 4 | 35 | 629 | D. HENRY | 7 |
| 45 | 1 | 1 | 10 | 25 | 4 | 35 | 764 | C. MCCAFFREY | 1 |
| 11 | 1 | 1 | 14 | 4 | 0 | 6 | 842 | B. ROETHLISBERGER | 6 |
| 13 | 1 | 1 | 10 | 26 | 9 | 11 | 889 | B. ROETHLISBERGER | 6 |
| 69 | 1 | 1 | 10 | 63 | 9 | 8 | 892 | J. JACKSON | 2 |
| 94 | 2 | 1 | 10 | 13 | 12 | 40 | 900 | C. SUTTON | 4 |
| 71 | 2 | 1 | 10 | 75 | 3 | 39 | 938 | J. JACKSON | 2 |
| 15 | 2 | 1 | 10 | 36 | 6 | 33 | 949 | B. ROETHLISBERGER | 6 |
| 115 | 2 | 1 | 10 | 24 | 22 | 30 | 1021 | D. HENRY | 7 |
| 17 | 2 | 1 | 10 | 51 | 6 | 44 | 1024 | B. ROETHLISBERGER | 6 |
| 19 | 2 | 1 | 10 | 83 | 17 | 6 | 1073 | B. ROETHLISBERGER | 6 |
| 96 | 2 | 1 | 10 | 59 | 9 | 40 | 1137 | C. SUTTON | 4 |

2. Filter "To Go" to X+1/−1 yards→only "To Go" of 9, 10 and 11

After this step, 64 plays remain in consideration for selection (a subset of these plays is displayed below)

TABLE 4

Remaining 64 Plays

| Index | Quarter | Down | ToGo | YardLine | Yards Gained | Time Elapse | Absolute Time | Player | Priority |
|---|---|---|---|---|---|---|---|---|---|
| 1 | 1 | 1 | 10 | 25 | 0 | 5 | 0 | B. ROETHLISBERGER | 6 |
| 39 | 1 | 1 | 10 | 25 | 4 | 31 | 0 | C. MCCAFFREY | 1 |
| 66 | 1 | 1 | 10 | 20 | 4 | 41 | 5 | J. JACKSON | 2 |
| 104 | 1 | 1 | 10 | 58 | 6 | 28 | 101 | D. HENRY | 7 |
| 42 | 1 | 1 | 10 | 49 | 5 | 30 | 143 | C. MCCAFFREY | 1 |
| 4 | 1 | 1 | 10 | 67 | 4 | 28 | 170 | B. ROETHLISBERGER | 6 |
| 6 | 1 | 1 | 10 | 80 | 10 | 42 | 241 | B. ROETHLISBERGER | 6 |
| 106 | 1 | 1 | 10 | 25 | 5 | 39 | 272 | D. HENRY | 7 |
| 107 | 1 | 1 | 10 | 41 | 7 | 33 | 341 | D. HENRY | 7 |
| 67 | 1 | 1 | 10 | 30 | 3 | 40 | 358 | J. JACKSON | 2 |
| 109 | 1 | 1 | 10 | 54 | 3 | 31 | 415 | D. HENRY | 7 |
| 68 | 1 | 1 | 10 | 55 | 0 | 42 | 440 | J. JACKSON | 2 |
| 9 | 1 | 1 | 10 | 28 | 9 | 38 | 498 | B. ROETHLISBERGER | 6 |
| 43 | 1 | 1 | 10 | 42 | 2 | 35 | 523 | C. MCCAFFREY | 1 |
| 10 | 1 | 1 | 10 | 47 | −10 | 43 | 579 | B. ROETHLISBERGER | 6 |

TABLE 4-continued

Remaining 64 Plays

| Index | Quarter | Down | ToGo | YardLine | Yards Gained | Time Elapse | Absolute Time | Player | Priority |
|---|---|---|---|---|---|---|---|---|---|
| 111 | 1 | 1 | 10 | 81 | 5 | 29 | 600 | D. HENRY | 7 |
| 112 | 1 | 1 | 9 | 91 | 4 | 35 | 629 | D. HENRY | 7 |
| 45 | 1 | 1 | 10 | 25 | 4 | 35 | 764 | C. MCCAFFREY | 1 |
| 13 | 1 | 1 | 10 | 26 | 9 | 11 | 889 | B. ROETHLISBERGER | 6 |
| 69 | 1 | 1 | 10 | 63 | 9 | 8 | 892 | J. JACKSON | 2 |
| 94 | 2 | 1 | 10 | 13 | 12 | 40 | 900 | C. SUTTON | 4 |
| 71 | 2 | 1 | 10 | 75 | 3 | 39 | 938 | J. JACKSON | 2 |
| 15 | 2 | 1 | 10 | 36 | 6 | 33 | 949 | B. ROETHLISBERGER | 6 |
| 115 | 2 | 1 | 10 | 24 | 22 | 30 | 1021 | D. HENRY | 7 |
| 17 | 2 | 1 | 10 | 51 | 6 | 44 | 1024 | B. ROETHLISBERGER | 6 |
| 19 | 2 | 1 | 10 | 83 | 17 | 6 | 1073 | B. ROETHLISBERGER | 6 |
| 96 | 2 | 1 | 10 | 59 | 9 | 40 | 1137 | C. SUTTON | 4 |
| 48 | 2 | 1 | 10 | 37 | 1 | 23 | 1313 | C. MCCAFFREY | 1 |
| 140 | 2 | 1 | 10 | 23 | 0 | 5 | 1330 | K. GOLLADAY | 8 |

3. Filter including only plays in same Scrimmage Zone Z->only plays ran between the 15 and 50 yard line
After this step, 41 plays remain in consideration for selection (a subset of these plays is displayed below)

TABLE 5

Remaining 41 Plays

| Index | Quarter | Down | ToGo | YardLine | Yards Gained | Time Elapse | Absolute Time | Player | Priority |
|---|---|---|---|---|---|---|---|---|---|
| 1 | 1 | 1 | 10 | 25 | 0 | 5 | 0 | B. ROETHLISBERGER | 6 |
| 39 | 1 | 1 | 10 | 25 | 4 | 31 | 0 | C. MCCAFFREY | 1 |
| 66 | 1 | 1 | 10 | 20 | 4 | 41 | 5 | J. JACKSON | 2 |
| 42 | 1 | 1 | 10 | 49 | 5 | 30 | 143 | C. MCCAFFREY | 1 |
| 106 | 1 | 1 | 10 | 25 | 5 | 39 | 272 | D. HENRY | 7 |
| 107 | 1 | 1 | 10 | 41 | 7 | 33 | 341 | D. HENRY | 7 |
| 67 | 1 | 1 | 10 | 30 | 3 | 40 | 358 | J. JACKSON | 2 |
| 9 | 1 | 1 | 10 | 28 | 9 | 38 | 498 | B. ROETHLISBERGER | 6 |
| 43 | 1 | 1 | 10 | 42 | 2 | 35 | 523 | C. MCCAFFREY | 1 |
| 10 | 1 | 1 | 10 | 47 | −10 | 43 | 579 | B. ROETHLISBERGER | 6 |
| 45 | 1 | 1 | 10 | 25 | 4 | 35 | 764 | C. MCCAFFREY | 1 |
| 13 | 1 | 1 | 10 | 26 | 9 | 11 | 889 | B. ROETHLISBERGER | 6 |
| 94 | 2 | 1 | 10 | 13 | 12 | 40 | 900 | C. SUTTON | 4 |
| 15 | 2 | 1 | 10 | 36 | 6 | 33 | 949 | B. ROETHLISBERGER | 6 |
| 115 | 2 | 1 | 10 | 24 | 22 | 30 | 1021 | D. HENRY | 7 |
| 48 | 2 | 1 | 10 | 37 | 1 | 23 | 1313 | C. MCCAFFREY | 1 |
| 140 | 2 | 1 | 10 | 23 | 0 | 5 | 1330 | K. GOLLADAY | 8 |
| 20 | 2 | 1 | 10 | 13 | 24 | 43 | 1340 | B. ROETHLISBERGER | 6 |
| 117 | 2 | 1 | 10 | 14 | 12 | 28 | 1409 | D. HENRY | 7 |
| 118 | 2 | 1 | 10 | 26 | 7 | 33 | 1437 | D. HENRY | 7 |
| 120 | 2 | 1 | 10 | 37 | 4 | 33 | 1499 | D. HENRY | 7 |
| 24 | 2 | 1 | 10 | 39 | 0 | 4 | 1560 | B. ROETHLISBERGER | 6 |
| 152 | 2 | 1 | 10 | 34 | 16 | 36 | 1644 | C. HERNDON | 10 |
| 27 | 2 | 1 | 10 | 19 | 0 | 21 | 1779 | B. ROETHLISBERGER | 6 |
| 75 | 2 | 1 | 10 | 20 | 7 | 9 | 1791 | J. JACKSON | 2 |
| 55 | 3 | 1 | 10 | 17 | 3 | 46 | 1945 | C. MCCAFFREY | 1 |
| 76 | 3 | 1 | 10 | 24 | 2 | 40 | 2008 | J. JACKSON | 2 |
| 77 | 3 | 1 | 10 | 43 | 9 | 41 | 2086 | J. JACKSON | 2 |
| 125 | 3 | 1 | 10 | 15 | 13 | 28 | 2157 | D. HENRY | 7 |

4. Filter including only plays with game time Y+/−60 seconds->only include plays ran between absolute game time of 41 and 161 seconds After this step, 1 plays remains. The play has priority ONE so it is selected and applied to the game scenario to advance the game and create a new game scenario

TABLE 6

Remaining 1 Play

| Index | Quarter | Down | ToGo | YardLine | Yards | Time Elapse | Absolute Time | Player | Priority |
|---|---|---|---|---|---|---|---|---|---|
| 42 | 1 | 1 | 10 | 49 | 5 | 30 | 143 | C. MCCAFFREY | 1 |

The remaining one "C.McCaffery" play is applied to the Fantasy game. Before the play, the game scenario was 1st and 10 on the 20 yard line with 13:19 left in the 1st quarter. The play gained 5 yards and took 30 seconds of game time. The new current fantasy game scenario is 2nd and 5 on the 25 yard line with absolute game time of 131 seconds (12:49 left in the 1st quarter). The selected "C.McCaffery" play is redacted from the Play Portfolio. This process is repeated during the "$2^{nd}$ down" Filtering process to identify the selected play.

The following example applies to the Weighted Averages Selection Criteria Process to identify selected play to apply to current fantasy game scenario. The Play Portfolio is compiled of 155 plays in total.

Current Fantasy Game Scenario—

1st and 10 to Go at game time 101 seconds (absolute game clock) at Yard Line 20

Factors are weighted based on similarity of each play to the current fantasy game scenario for Down, To Go, Yard Line and Game Clock. The average of these four scores is used to identify the three plays which are most similar. The play from the top 3 with the highest player portfolio is chosen as the selected play.

upon conducting a fantasy basketball game and are designed to demonstrate workflows that can be applied to assigning the first set of priorities to the first plurality of players and to selecting a play from the first play portfolio based upon first selection criteria.

In a fantasy basketball game, the following examples can be used to identify a play. Offensive Plays at game time X with Y elapsed time: Offensive Foul, Offensive Turnover, Offensive Rebound, Made 2 pt or 3 pt basket, Missed 2 pt or 3 pt basket—including blocked shots for offensive players, Assist, Foul Shot. Defensive Plays at game time X with Y elapsed time: Shooting Foul, Non-Shooting Defensive Foul, Defensive Turnover Caused, Defensive Blocked Shot, Defensive Rebound.

Prior to defining the play portfolio, the substitutions for the entire game can be carried out before the fantasy sporting event begins. Players who are on the floor at a given time are eligible to contribute to the fantasy game. Players are substituted out of the fantasy game based on the actual substitutions in the real games and player priority in the

TABLE 7

Weighted Average of Plays

| Down | ToGo | YardLine | Yards | Time Elapse | Game Time | Player | Priority | Weighted Factors ||||| Average |
| | | | | | | | | Down | ToGo | Yard Line | Game Time | |
|---|---|---|---|---|---|---|---|---|---|---|---|---|
| 1 | 10 | 20 | 4 | 41 | 5 | J. JACKSON | 2 | 1 | 1 | 1 | 0.75 | 0.94 |
| 1 | 10 | 25 | 4 | 31 | 0 | C. MCCAFFREY | 1 | 1 | 1 | 1 | 0.75 | 0.89 |
| 1 | 10 | 25 | 0 | 5 | 0 | B. ROETHLISBERGER | 6 | 1 | 1 | 1 | 0.75 | 0.89 |
| 1 | 10 | 49 | 5 | 30 | 143 | C. MCCAFFREY | 1 | 1 | 1 | 1 | 0.95 | 0.86 |
| 1 | 10 | 25 | 5 | 39 | 272 | D. HENRY | 7 | 1 | 1 | 1 | 0.6 | 0.85 |
| 1 | 10 | 41 | 7 | 33 | 341 | D. HENRY | 7 | 1 | 1 | 1 | 0.5 | 0.75 |
| 1 | 10 | 30 | 3 | 40 | 358 | J. JACKSON | 2 | 1 | 1 | 1 | 0 | 0.68 |
| 1 | 10 | 28 | 9 | 38 | 498 | B. ROETHLISBERGER | 6 | 1 | 1 | 1 | 0 | 0.68 |
| 1 | 10 | 25 | 4 | 35 | 764 | C. MCCAFFREY | 1 | 1 | 1 | 1 | -0.3 | 0.64 |
| 1 | 10 | 26 | 9 | 11 | 889 | B. ROETHLISBERGER | 6 | 1 | 1 | 1 | -0.3 | 0.64 |
| 1 | 10 | 24 | 22 | 30 | 1021 | D. HENRY | 7 | 1 | 1 | 1 | -0.3 | 0.64 |
| 1 | 10 | 42 | 2 | 35 | 523 | C. MCCAFFREY | 1 | 1 | 1 | 1 | 0 | 0.63 |
| 1 | 10 | 47 | -10 | 43 | 579 | B. ROETHLISBERGER | 6 | 1 | 1 | 1 | 0 | 0.63 |
| 1 | 10 | 58 | 6 | 28 | 101 | D. HENRY | 7 | 1 | 1 | -1 | 1 | 0.63 |
| 1 | 10 | 20 | 7 | 9 | 1791 | J. JACKSON | 2 | 1 | 1 | 1 | -0.5 | 0.63 |
| 1 | 10 | 19 | 0 | 21 | 1779 | B. ROETHLISBERGER | 6 | 1 | 1 | 1 | -0.5 | 0.63 |
| 1 | 10 | 13 | 12 | 40 | 900 | C. SUTTON | 4 | 1 | 1 | 1 | -0.3 | 0.61 |

This "C.McCaffery" play (the second of the top three in Table 7 above) is applied to the Fantasy game. Before the play, the game scenario was 1st and 10 on the 20 yard line with 13:19 left in the 1st quarter. The play gained 4 yards and took 31 seconds of game time. The new current fantasy game scenario is 2nd and 6 on the 24 yard line with absolute game time of 132 seconds (12:48 left in the 1st quarter). The selected "C.McCaffery" play is redacted from the Play Portfolio. This process is repeated during the "$2^{nd}$ down" Filtering process to identify the selected play.

As described, ways of conducting a fantasy sports game provided herein can perform a fantasy sporting event by comparing a game situation with a first play portfolio and selecting a play from the first play portfolio based upon first selection criteria. The first selection criteria can include a first set of priorities assigned to the first plurality of players and a statistic of the play. The following examples are based fantasy game. The objective can be to have the highest priority players in the fantasy game. When a high priority player exits the actual game, the next highest priority player of the same position can be inserted. When a higher priority player is reinserted into an actual game, they can be inserted in the fantasy game after the execution of the next play, regardless of if there is a dead game or not. Only plays which occurred while the player was "in the game" may be executed in the fantasy game flow. The TWO guards, TWO forwards, and ONE center with the highest priority can contribute all of their plays since they will be "in the game" whenever the players are on the floor for the actual game. Below is an example of substitutions of the $1^{st}$ half (24 minutes) of a real game and how they impact the players on the floor for the fantasy game, where priority is indicated next to the player's name, and for simplicity, game minutes are presented as whole numbers:

TABLE 8

Fantasy Basketball Players and Priorities

| Guards | | Forwards | | Centers | |
|---|---|---|---|---|---|
| J. Harden-2 | | L. James-1 | | A. Davis-3 | |
| Start | In | Start | In | Start | In |
| 6 | Out | 15 | Out | 8 | Out |
| 12 | In | 19 | In | 15 | In |
| 15 | Out | Halftime | | 20 | Out |
| 18 | In | | | | |
| Halftime | | | | | |
| D. Lilliard-4 | | P. George-5 | | N. Jokic-7 | |
| Start | In | Start | In | Start | In |
| 4 | Out | 6 | Out | 10 | Out |
| 9 | In | 9 | In | 16 | In |
| 21 | Out | 12 | Out | Halftime | |
| Halftime | | 18 | In | | |
| | | Halftime | | | |
| R. Westbrook-8 | | K. Leonard-6 | | J. Embiid-11 | |
| Start | In | Start | In | Start | In |
| 13 | Out | 16 | Out | 5 | Out |
| 20 | In | 20 | In | 9 | In |
| Halftime | | Halftime | | 17 | Out |
| | | | | 22 | In |
| | | | | Halftime | |
| L. Doncic-9 | | J. Tatum-10 | | | |
| Start | Out | Start | In | | |
| 9 | In | 6 | Out | | |
| 14 | Out | 8 | In | | |
| 21 | In | 19 | Out | | |
| Halftime | | 22 | In | | |
| | | Halftime | | | |

With reference to FIG. 6, the dark boxes indicate the players which are on the floor for the fantasy game. The lighter boxes indicate that the player was on the floor in the real game, but not the fantasy game.

Table 9 below is another representation of which players were on the floor at a given time and the relative priority of each player while they were in the game.

TABLE 9

Fantasy Basketball Players Playing Time and Priorities

| Min | Highest | | Priority | | Lowest |
|---|---|---|---|---|---|
| 1 | L. James-1 | J. Harden-2 | A. Davis-3 | D. Lilliard-4 | P. George-5 |
| 2 | L. James-1 | J. Harden-2 | A. Davis-3 | D. Lilliard-4 | P. George-5 |
| 3 | L. James-1 | J. Harden-2 | A. Davis-3 | D. Lilliard-4 | P. George-5 |
| 4 | L. James-1 | J. Harden-2 | A. Davis-3 | P. George-5 | R. Westbrook-8 |
| 5 | L. James-1 | J. Harden-2 | A. Davis-3 | P. George-5 | R. Westbrook-8 |
| 6 | L. James-1 | A. Davis-3 | K. Leonard-6 | R. Westbrook-8 | L. Doncic-9 |
| 7 | L. James-1 | A. Davis-3 | K. Leonard-6 | R. Westbrook-8 | L. Doncic-9 |
| 8 | L. James-1 | K. Leonard-6 | N. Jokic-7 | R. Westbrook-8 | L. Doncic-9 |
| 9 | L. James-1 | D. Lilliard-4 | P. George-5 | N. Jokic-7 | R. Westbrook-8 |
| 10 | L. James-1 | D. Lilliard-4 | P. George-5 | R. Westbrook-8 | J. Embiid-11 |
| 11 | L. James-1 | D. Lilliard-4 | P. George-5 | R. Westbrook-8 | J. Embiid-11 |
| 12 | L. James-1 | J. Harden-2 | D. Lilliard-4 | K. Leonard-6 | J. Embiid-11 |
| 13 | L. James-1 | J. Harden-2 | D. Lilliard-4 | K. Leonard-6 | J. Embiid-11 |
| 14 | L. James-1 | J. Harden-2 | D. Lilliard-4 | K. Leonard-6 | J. Embiid-11 |
| 15 | A. Davis-3 | D. Lilliard-4 | K. Leonard-6 | L. Doncic-9 | J. Tatum-10 |
| 16 | A. Davis-3 | D. Lilliard-4 | P. George-5 | L. Doncic-9 | J. Tatum-10 |
| 17 | A. Davis-3 | D. Lilliard-4 | P. George-5 | L. Doncic-9 | J. Tatum-10 |
| 18 | J. Harden-2 | A. Davis-3 | D. Lilliard-4 | P. George-5 | J. Tatum-10 |
| 19 | L. James-1 | J. Harden-2 | A. Davis-3 | D. Lilliard-4 | P. George-5 |
| 20 | L. James-1 | J. Harden-2 | D. Lilliard-4 | P. George-5 | N. Jokic-7 |
| 21 | L. James-1 | J. Harden-2 | P. George-5 | N. Jokic-7 | R. Westbrook-8 |
| 22 | L. James-1 | J. Harden-2 | P. George-5 | N. Jokic-7 | R. Westbrook-8 |
| 23 | L. James-1 | J. Harden-2 | P. George-5 | N. Jokic-7 | R. Westbrook-8 |
| 24 | L. James-1 | J. Harden-2 | P. George-5 | N. Jokic-7 | R. Westbrook-8 |

Once all of the player substitutions for the game are determined, the play portfolio can be created. All plays, which occur at a real game time which corresponds to a time that the player is "in" the fantasy game, are contributed to the play portfolio. Since turnovers are a positive event for the defense and a negative event for the offense, the event can be represented twice in the box score. For example, if an offensive and defensive player are both in the fantasy game and the defensive player steals the ball from the offensive player, this event would contribute a steal for the defensive player and a turnover for the offensive player to the play portfolio. The play would be executed twice. In order to avoid double counting, only odd offensive and even defensive turnovers remain in the play portfolio. The other even offensive and odd defensive turnovers are discarded before the selection of plays begins. In certain embodiments, only fouls committed are included. In certain embodiments, fouls drawn are not included in the play portfolio.

Selection Criteria at Game Time X

1. If any offensive foul or defensive foul was committed between game start and X+24 seconds, the foul with lowest game time is the selected play. The clock is advanced for the foul. If a shooting foul or technical foul is committed go to step 4. If a non-shooting defensive foul is committed increase team foul by one and return to Step 1. If an offensive foul is committed, the ball is turned over to the other team and return to Step 1. If no foul, continue to step 2.
2. If any offensive turnover or defensive turnover including blocks are committed between game start and X+24 second, the turnover or block with lowest game time is the selected play. The clock is advanced for each turnover or block. Offensive turnover by offense or defensive turnover by defense will both result in the defense taking possession of the ball and return to Step 1. A defensive block will be treated like a missed shot, go to step 5. If no turnover or block, continue to step 3.
3. Filter to only made shots, missed shots and assists which occurred during game time of X+24/−24 seconds. If one or more plays is found, select the play from the player with the highest priority. If no plays are found, increase the game time to X+48/−48 and select the play from the player with the highest priority. Continue expanding the game time until a play is found. Only plays from players currently on the floor and during the current stretch of floor time (ie only time between previous enter before X and next game exit after X halftime inclusive) can be selected. If game time window is expanded to the maximum possible and no play exists, advance the clock 24 seconds and turn the ball over to the other team. The clock is advanced for each made shot, missed shot and assist. For a made shot, the team's score is increased, possession is changed to the other team and return to step 1. For a missed shot, go to step 5. For an assist go to step 6.

4. Identify the quantity of unplayed foul shots for each offensive player on the floor for that particular stretch of floor time. The player with the highest quantity will have their foul shots selected with tiebreaker being player priority. Depending on the foul either one, two or three foul shots are selected. The foul shots closest to X for that player are selected. Points are added to the offensive team for made foul shots. If the final foul shot is made, possession is changed to the other team and return to step 1. If the final foul shot is missed, go to step 5.

5. A missed shot must be matched with an offensive or defensive rebound to determine possession. The game time used for determining the rebound selected is X plus the advanced time from the previous step. The closest available offensive or defensive rebound to the rebound game time is used to determine possession. Rebounds do not advance the game clock. If the offense retains the ball, return to step 1 for same team. If the defense rebounds the ball, return to step 1 for the opposing team.

6. An assist must be matched with an assisted made shot from another player on the court. The closest assisted made shot to X plus the advanced time from previous step is selected, regardless of player priority (must be in the same floor stretch). The points are added to the team score and the made basket is removed from the play portfolio. The game clock is not advanced for the made basket because the game clock has already advanced for the assist. In the unlikely case that the assist is unable to match with a made assisted basket, the assist is treated like a missed shot with offensive rebound and return to step 1.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A method of conducting a fantasy sports game, the method comprising:
    (a) receiving historical data corresponding to a first plurality of plays performed by a first plurality of players of one or more real sporting events to create a first play portfolio;
    (b) performing a fantasy sporting event by comparing a game situation with the first play portfolio and selecting a play from the first play portfolio based upon first selection criteria, the first selection criteria including a first set of priorities assigned to the first plurality of players and a historical statistic of the play;
    (c) executing the selected play from the first play portfolio to advance the game situation based upon the selected play and update the game situation;
    (d) outputting a result of the execution of the selected play from the first play portfolio, wherein the outputting of the result of the execution of the selected play is performed by a computing device configured to execute the method of conducting the fantasy sport game, wherein the outputting of the result of the execution of the selected play comprises a member selected from a group consisting of: displaying a graphic via the computing device; displaying an animation via the computing device; playing an audio file via the computing device; playing a video file via the computing device; and combinations thereof;
    (e) redacting the selected play from the first play portfolio; and
    (f) repeating steps (b), (c), (d), and (e) to continue to advance the game situation based upon another selected play from the first play portfolio, to update the game situation, to output the result of the execution of the another selected play from the first play portfolio via the computing device, and to redact the another selected play from the first play portfolio until a predetermined event occurs.

2. The method of claim 1, wherein prior to step (b), the method further comprises:
    assigning, by a first user, the first set of priorities to the first plurality of players, the first plurality of players being on a first fantasy team.

3. The method of claim 2, the method further comprising creating the first fantasy team by having the first user select the first plurality of players on the first fantasy team.

4. The method of claim 3, wherein creating the first fantasy team by having the first user select the first plurality players on the first fantasy team includes creating a plurality of fantasy teams by having a plurality of users select a plurality of players on the plurality of fantasy teams.

5. The method of claim 2, wherein the assigning step includes assigning, by a plurality of users, a plurality of sets of priorities to a plurality of players on a plurality of fantasy teams, each of the plurality of players corresponding to a plurality of players of one or more real sporting events.

6. The method of claim 2, wherein the priorities assigned by the first user to the first plurality of players on the first fantasy team include ordering the first plurality of players from a highest priority to a lowest priority.

7. The method of claim 2, wherein the receiving step includes where the first play portfolio replaces a previous play portfolio, the previous play portfolio based upon receiving previous historical data corresponding to a plurality of plays performed by the first plurality of players of one or more previous real sporting events to create the previous play portfolio.

8. The method of claim 1, wherein step (b) comprises performing a plurality of fantasy sporting events, where each fantasy sporting event is performed by comparing a game situation with a plurality of play portfolios and selecting a play from the plurality of play portfolios based upon a plurality of selection criteria, the plurality of selection criteria including a plurality of sets of priorities assigned to the plurality of players and a historical statistic of the play.

9. The method of claim 1, wherein the game situation comprises a member selected from a group consisting of: a field position; a down and distance; a game time; a score differential; an inning; a number of runs; pitch count; a number of outs; two-point baskets; three-point baskets; a score; a court position; and combinations thereof.

10. The method of claim 1, wherein the historical statistic of the play comprises a member selected from a group consisting of: a field position; a down and distance; a game time; a score differential; an inning; a number of runs; pitch count; a number of outs; two-point baskets; three-point baskets; a score; a court position; and combinations thereof.

11. The method of claim 1, wherein step (b) includes determining a plurality of fits between the game situation and the historical statistics of the plays from the first play portfolio and selecting the play from the plurality of fits based upon the first set of priorities assigned to the first plurality of players available in the plurality of fits.

12. The method of claim 1, wherein a first instance of step (b) includes using a starting situation as the game situation, the starting situation including a member selected from the group consisting of a starting field position and a game time.

13. The method of claim 1, wherein step (e) further includes redacting all plays performed by a player from the first play portfolio when the selected play in step (b) identifies an injury to the player.

14. The method of claim 13, further comprising increasing at least one priority for at least one other player at the same position as the injured player.

15. The method of claim 1, wherein the predetermined event comprises a member selected from a group consisting of: a scoring event; a turnover; a change of possession; an end of a game period; a halftime of the game; an expiration of game time.

16. The method of claim 1, further comprising:
(g) assigning, by a second user, a second set of priorities to a second plurality of players on a second fantasy team, the second plurality of players corresponding to a second plurality of players of one or more real sporting events;
(h) receiving historical data corresponding to a second plurality of plays performed by the second plurality of players of the one or more real sporting events to create a second play portfolio;
(i) performing the fantasy sporting event by comparing the game situation with the second play portfolio and selecting a play from the second play portfolio based upon second selection criteria, the second selection criteria including the second set of priorities assigned to the second plurality of players and a historical statistic of the play;
(j) executing the selected play from the second play portfolio to advance the game situation based upon the selected play and update the game situation;
(k) redacting the selected play from the second play portfolio; and
(l) repeating steps (i), (j), and (k) to continue to advance the game situation based upon another selected play from the second play portfolio, to update the game situation, and to redact the another selected play from the second play portfolio until a second predetermined event occurs.

17. The method of claim 16, wherein each of the first predetermined event and the second predetermined event independently comprises a member selected from a group consisting of: a scoring event; a turnover; a change of possession; an end of a game period; a halftime of the game; an expiration of game time.

18. The method of claim 16, wherein prior to step (g), the method further comprises creating the second fantasy team by having the second user select the second plurality of players on the second fantasy team.

\* \* \* \* \*